Figure 1:
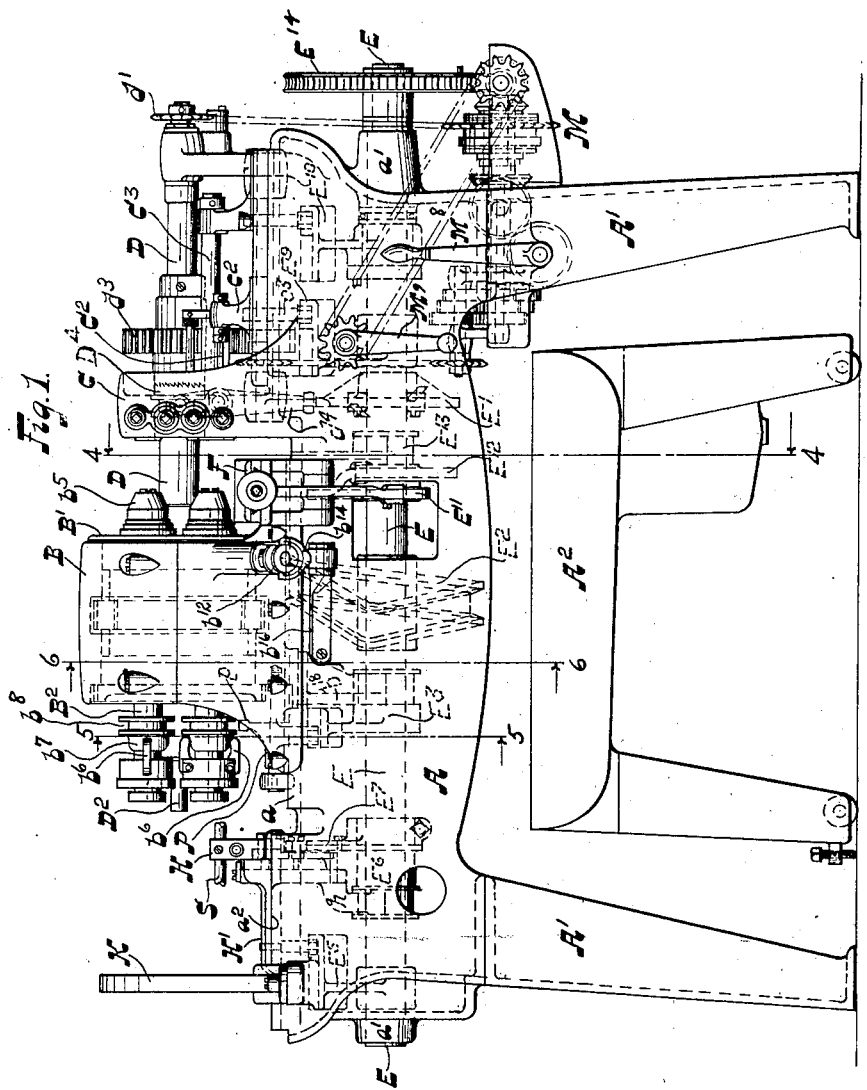

J. J. GRANT.
MULTIPLE SPINDLE LATHE.
APPLICATION FILED APR. 28, 1906.

926,736.

Patented July 6, 1909.
12 SHEETS—SHEET 1.

J. J. GRANT.
MULTIPLE SPINDLE LATHE.
APPLICATION FILED APR. 28, 1906.

926,736.

Patented July 6, 1909.
12 SHEETS—SHEET 3.

Witnesses:
F. H. Swabb
Jno. F. Oberlin

Inventor,
John J. Grant
by his attorney,
J. D. Pay

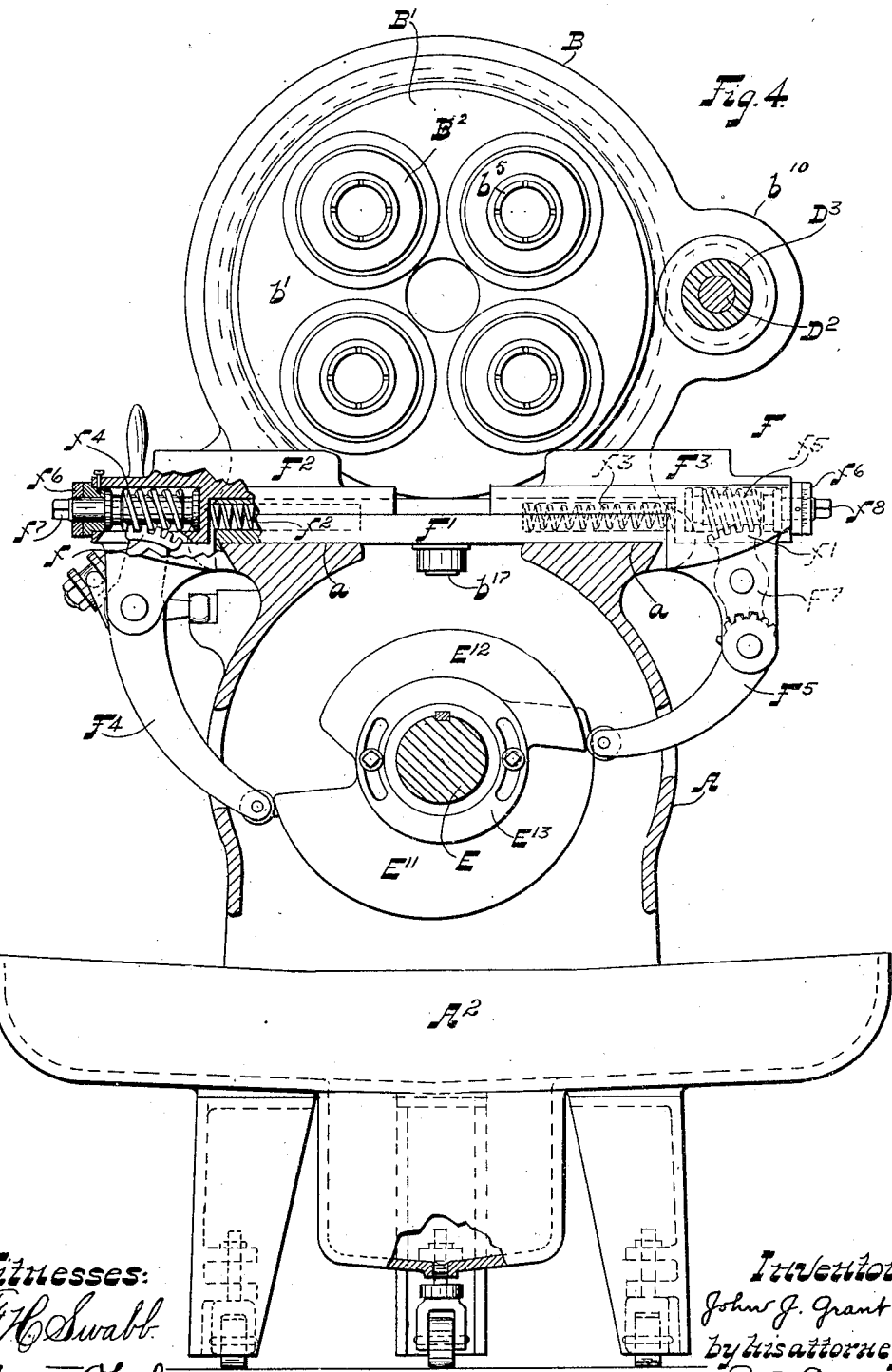

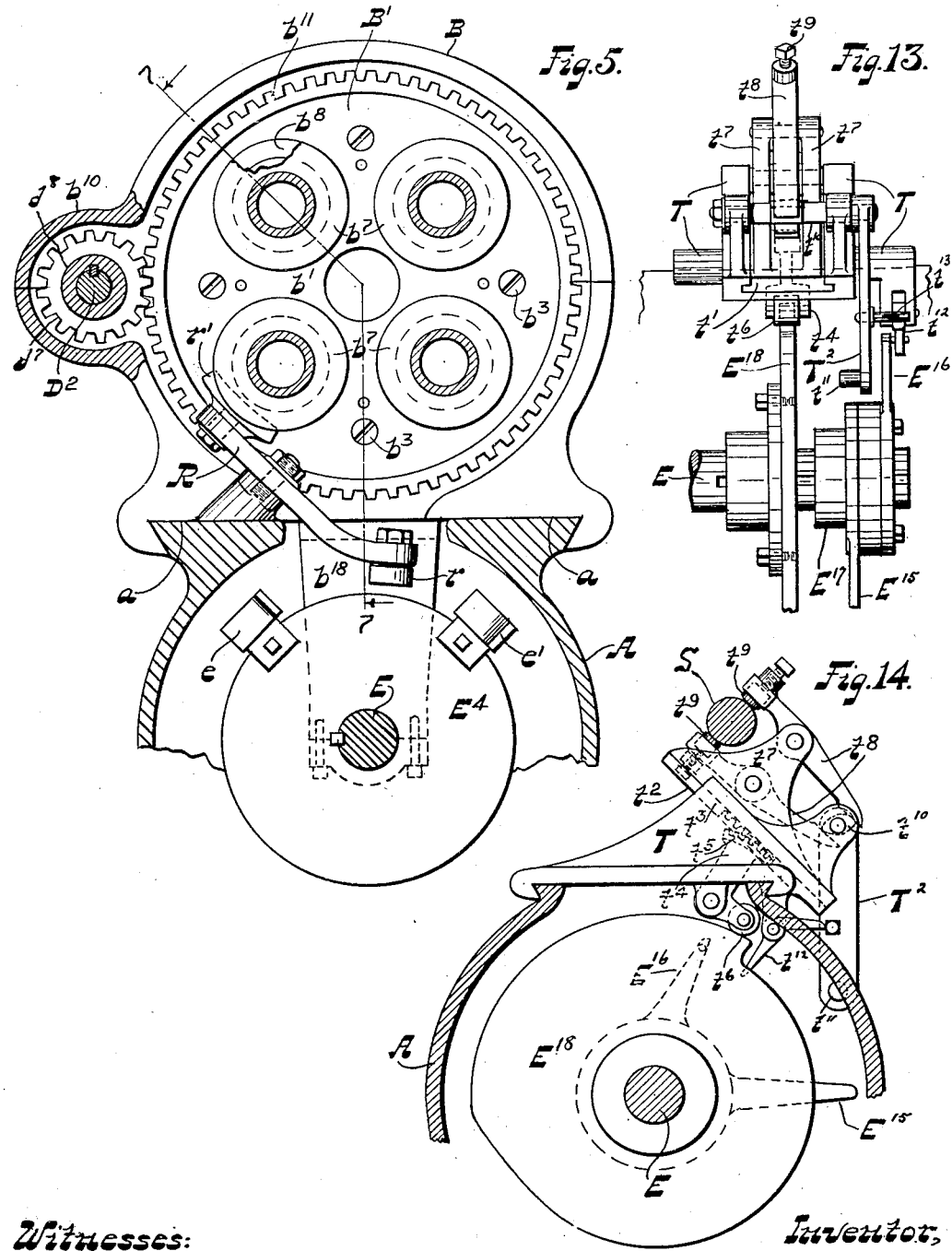

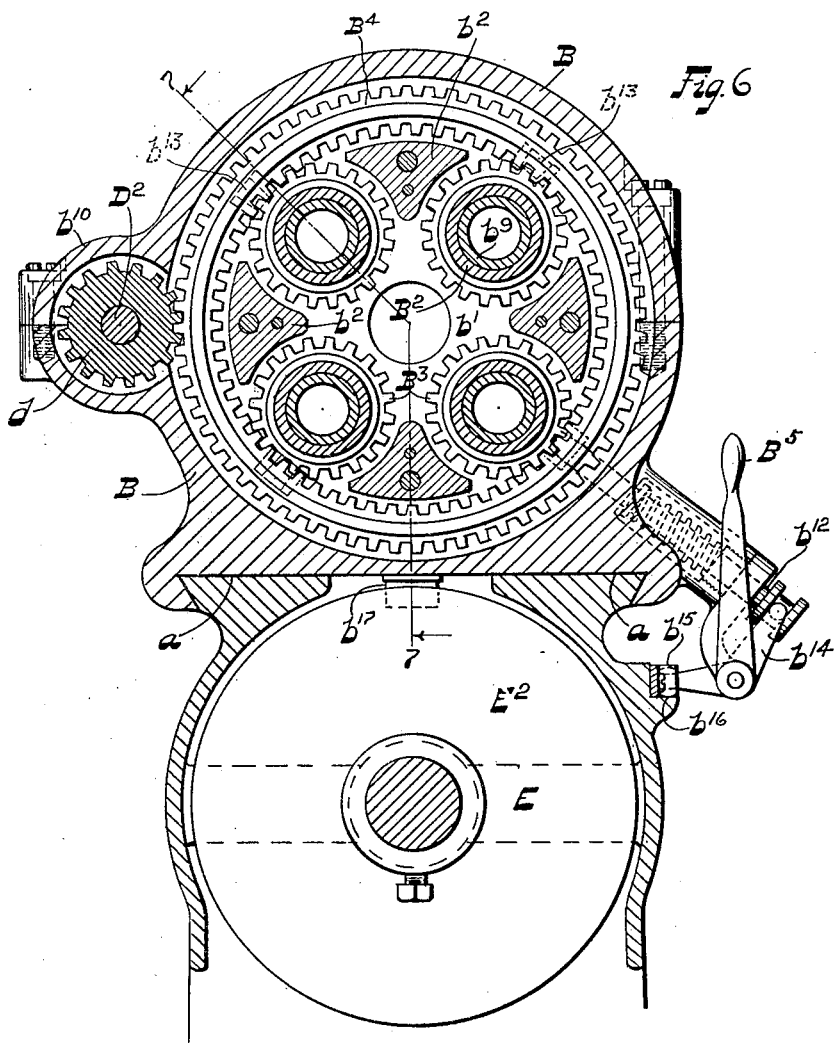

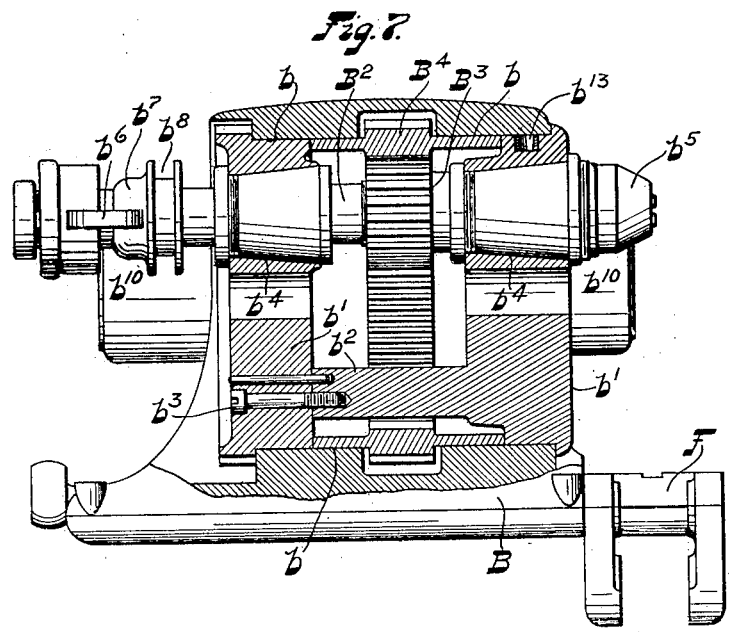
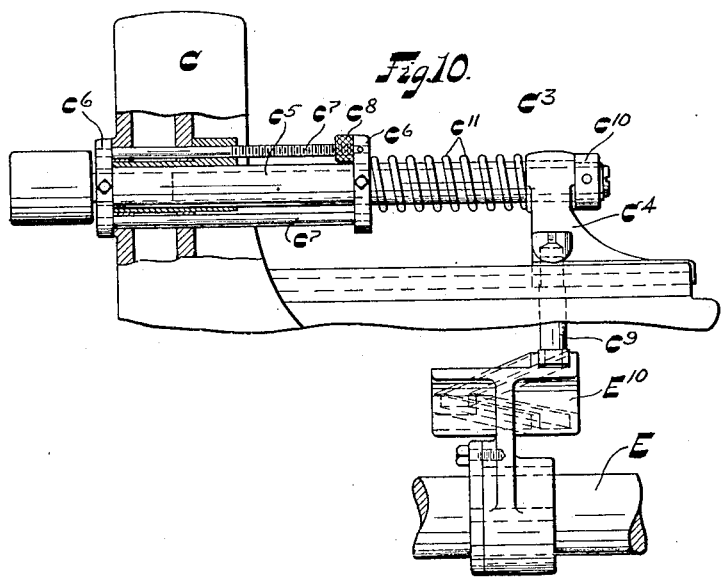

J. J. GRANT.
MULTIPLE SPINDLE LATHE.
APPLICATION FILED APR. 28, 1906.

926,736.

Patented July 6, 1909.
12 SHEETS—SHEET 8.

Witnesses:
F. H. Swabb.
Jno. F. Oberlin.

Inventor,
John J. Grant
by his attorney,
J. K. Fay

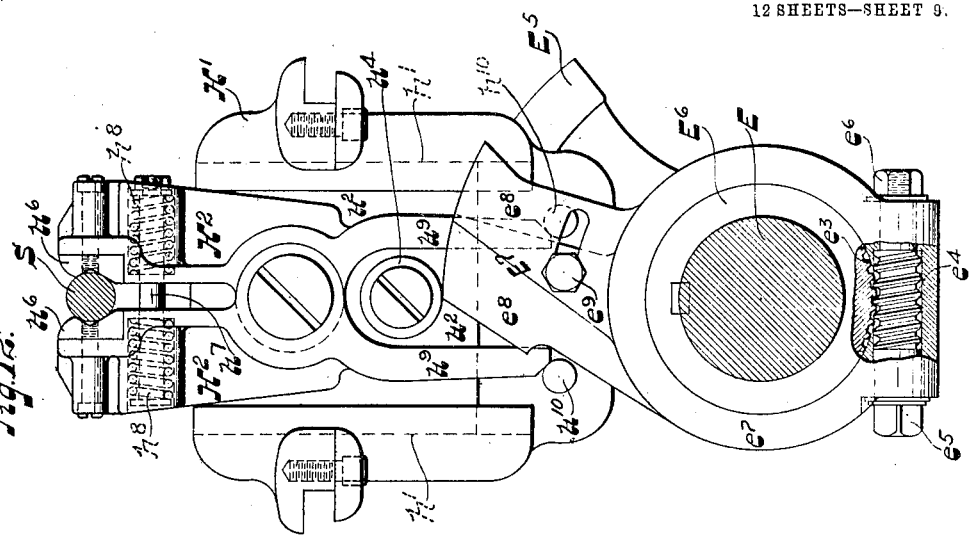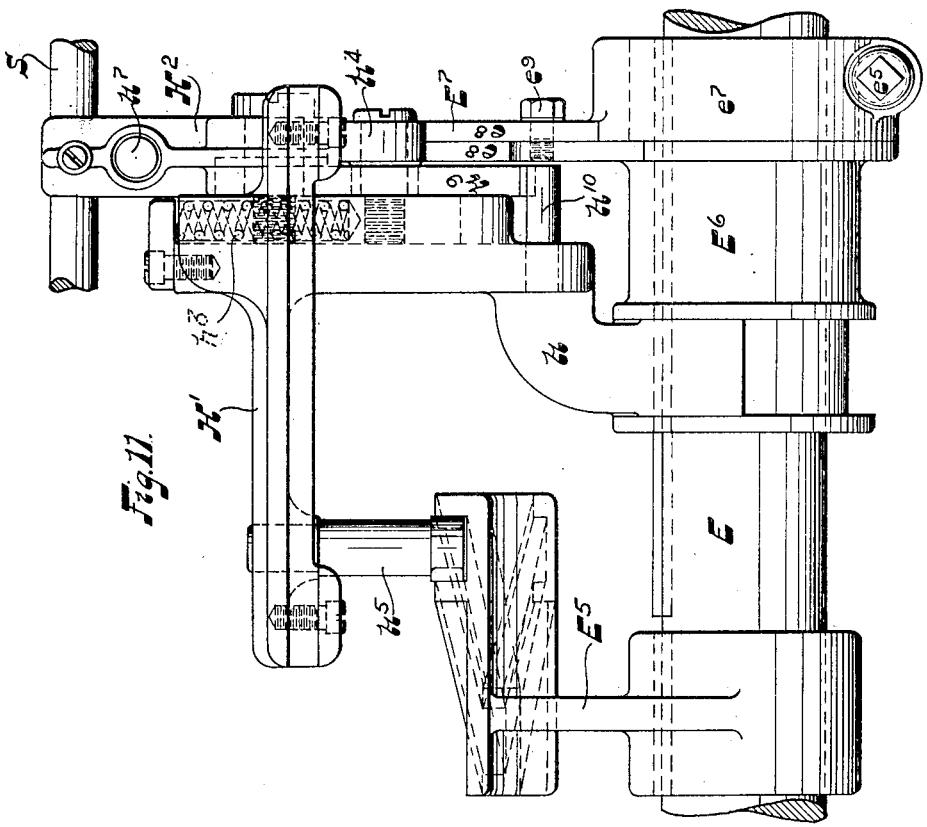

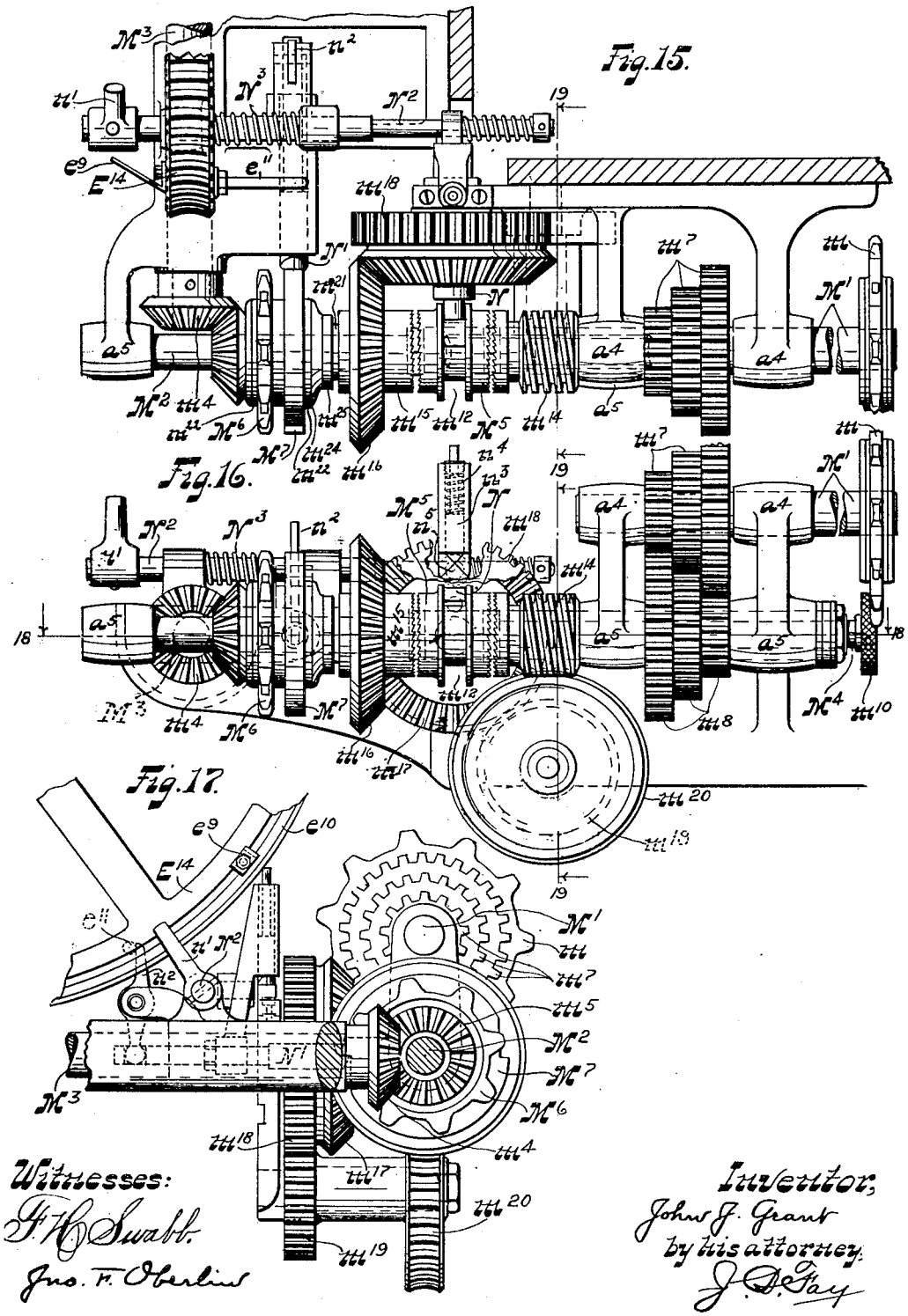

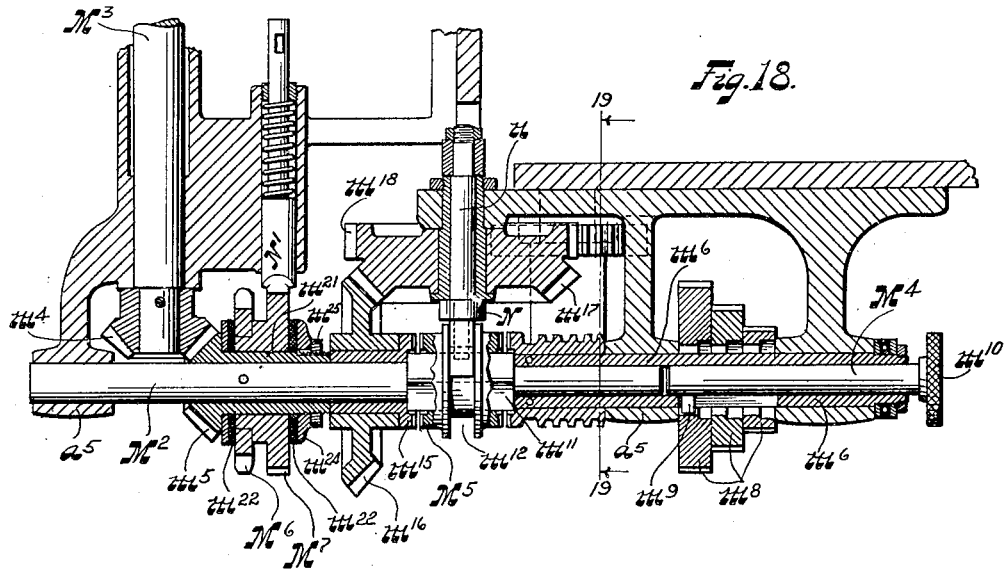
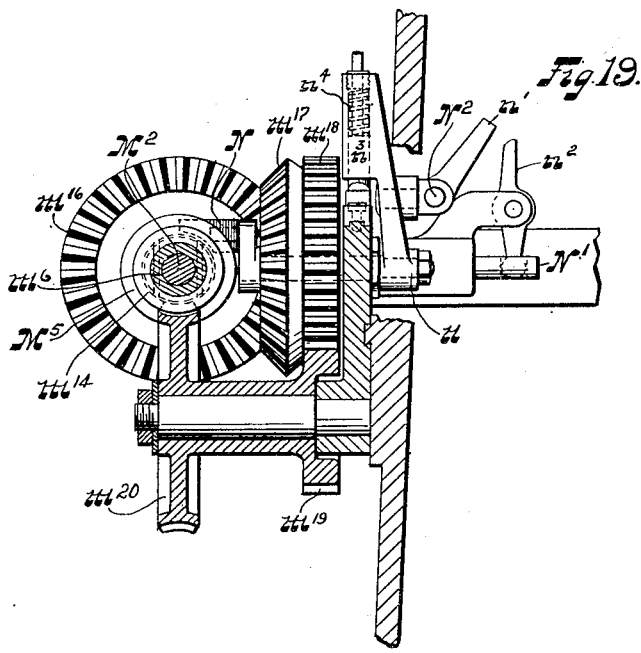

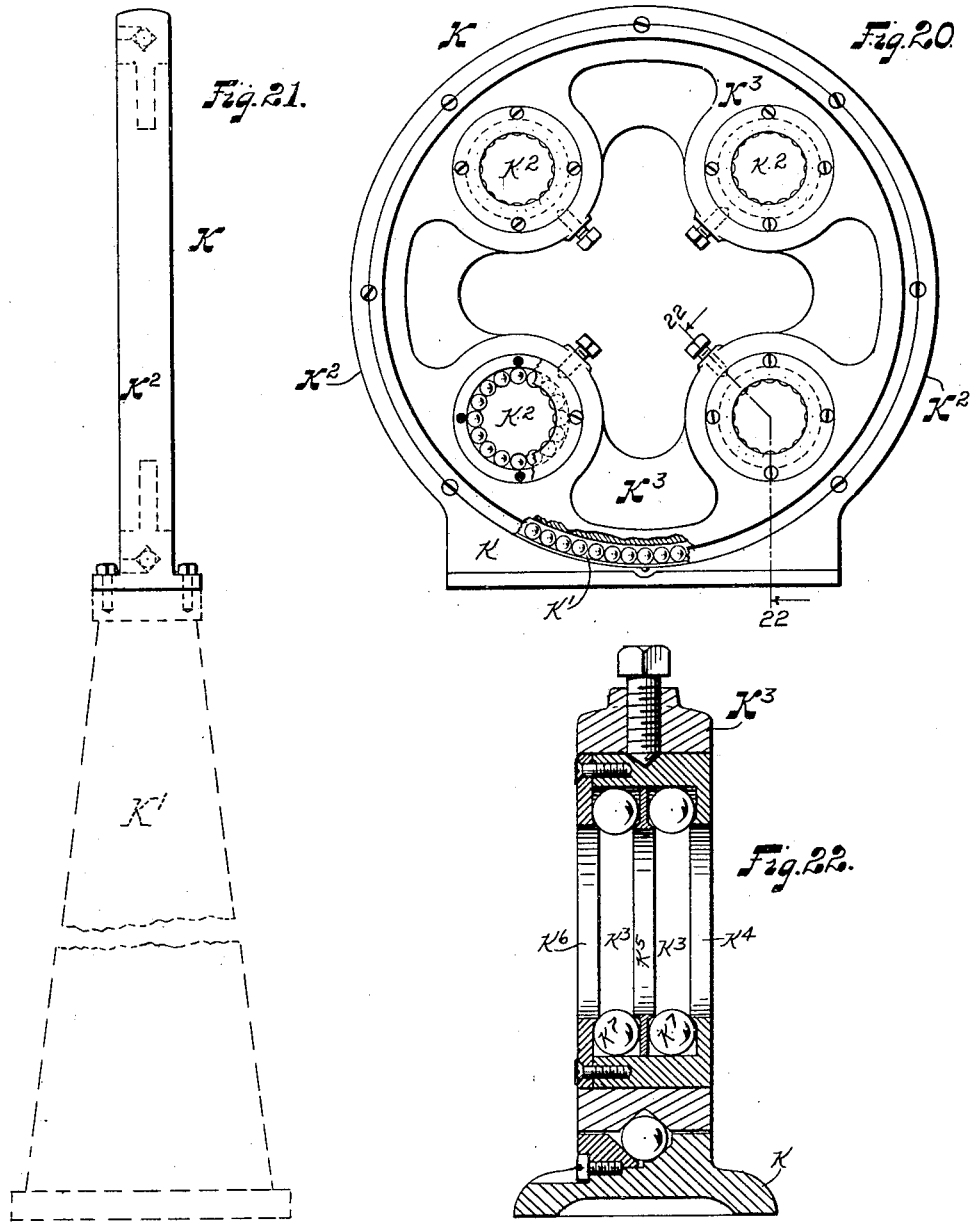

UNITED STATES PATENT OFFICE.

JOHN J. GRANT, OF CLEVELAND, OHIO, ASSIGNOR TO THE GRANT AUTOMATIC MACHINE COMPANY, OF CLEVELAND, OHIO, A CORPORATION OF OHIO.

MULTIPLE-SPINDLE LATHE.

No. 926,736.        Specification of Letters Patent.        Patented July 6, 1909.

Application filed April 28, 1906. Serial No. 314,197.

*To all whom it may concern:*

Be it known that I, JOHN J. GRANT, a citizen of the United States, resident of Cleveland, county of Cuyahoga, and State of Ohio, have invented a new and useful Improvement in Multiple-Spindle Lathes, of which the following is a specification, the principle of the invention being herein explained and the best mode in which I have contemplated applying that principle, so as to distinguish it from other inventions.

My invention relates to automatic lathes and particularly to that type of automatic lathes in which a plurality of spindles is employed.

Multiple spindle lathes, it will be obvious, present numerous features, such as increased capacity and resultant efficiency as well as a reduction in operating expense, that recommend them for many classes of work, even though they are not capable, at least in their present form, of doing as accurate work as the older type of lathe having but a single spindle.

My invention comprehends numerous improvements in the existing form of multiple spindle lathes, whereby I aim to still further increase the capacity of such machines, while at the same time enabling them to produce a better quality of work. Certain of these improvements are more or less radical in their nature and are quite capable of being utilized in the construction of single spindle lathes; prime among these is the use of a fixed tool-head and, in conjunction therewith, of a movable spindle head; aside from structural changes involved along with the above, other such improvements are found in the stock-feeding and speed-changing mechanisms, in the cross-slide and the cams employed in connection therewith, in the stock rest, in the die-holding and operating mechanism, and in various other minor details.

All the means, including the above, that enter into the construction of my improved lathe, will be hereinafter fully described and those forming a part of my invention will be specifically set forth in the claims.

The annexed drawings and the following description set forth in detail certain mechanism embodying the invention, such disclosed means constituting but one of various mechanical forms in which the principle of the invention may be used.

Figure 2:
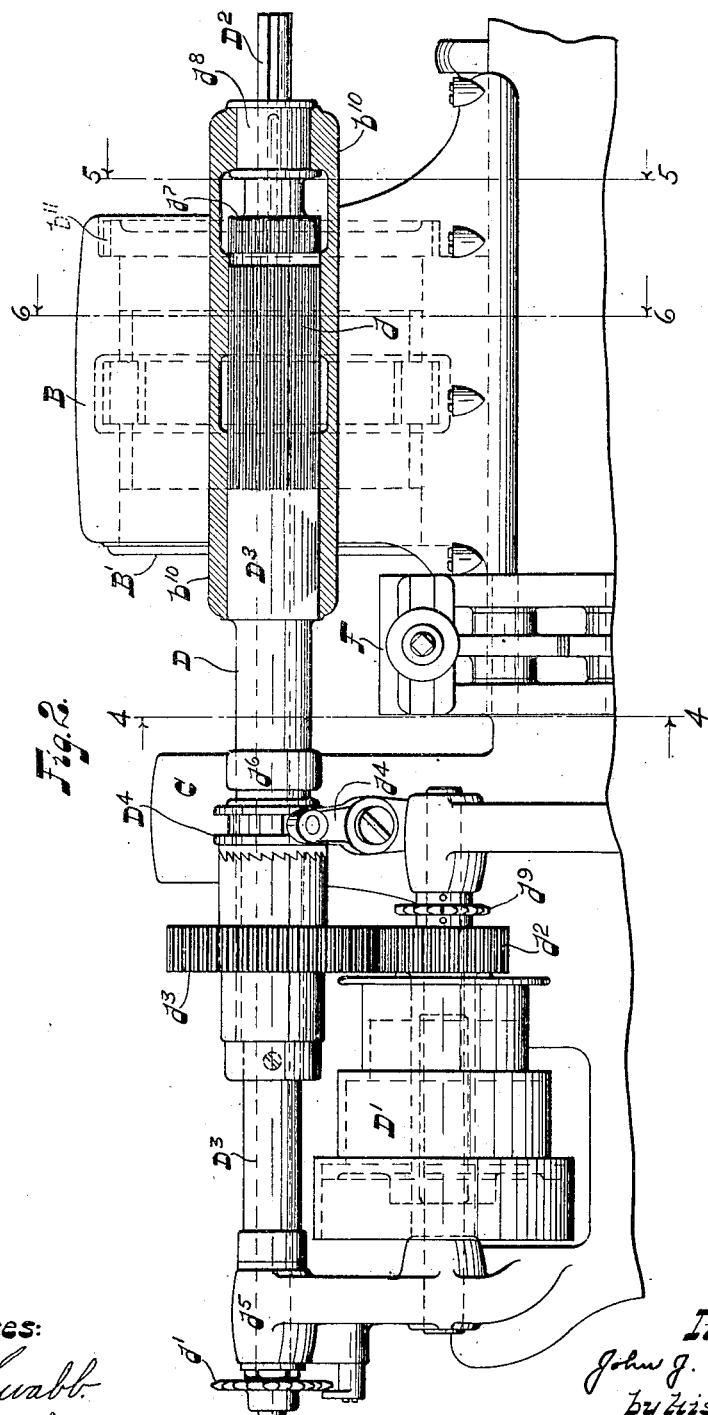
Figure 3:
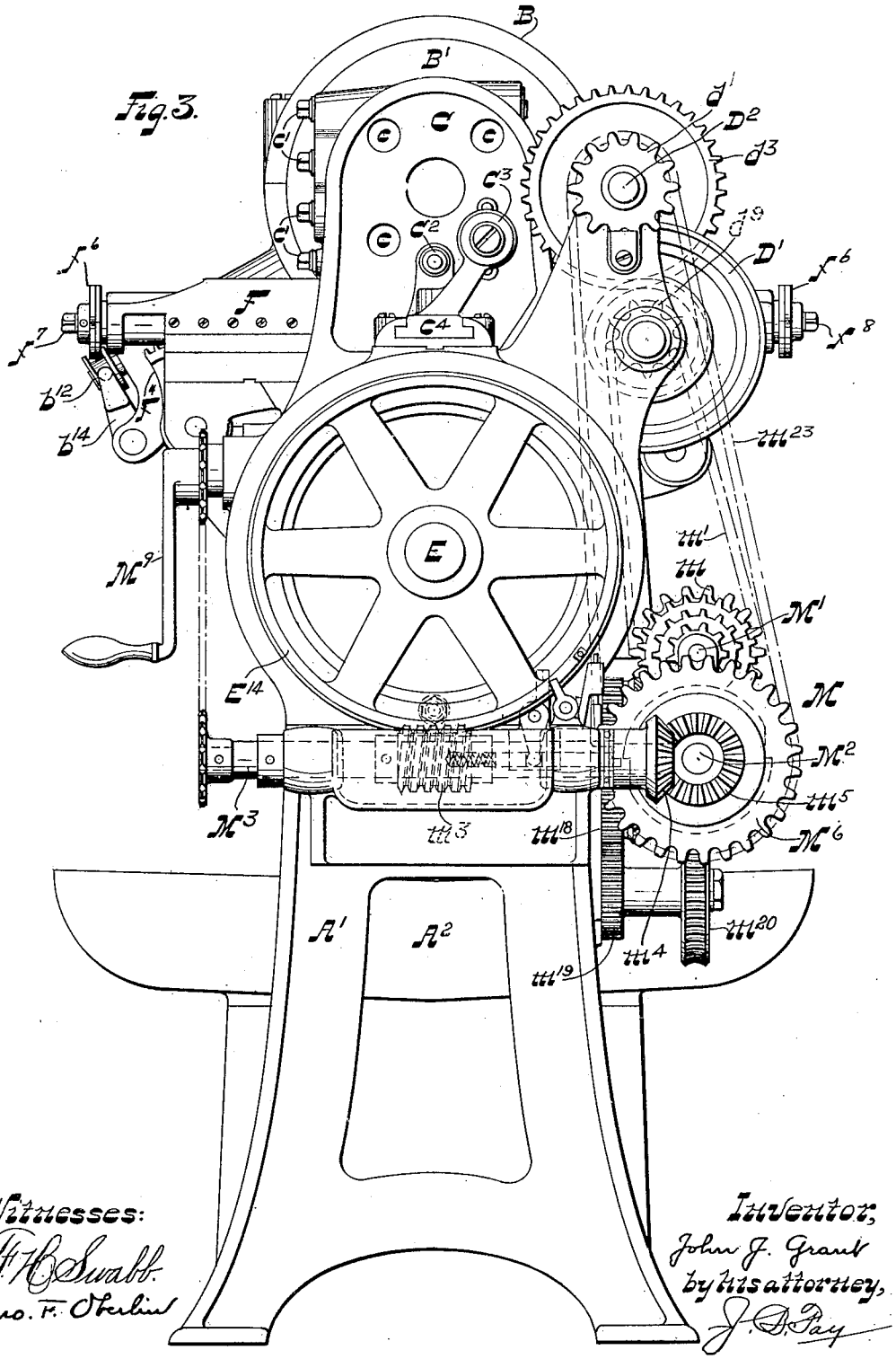
Figure 8:
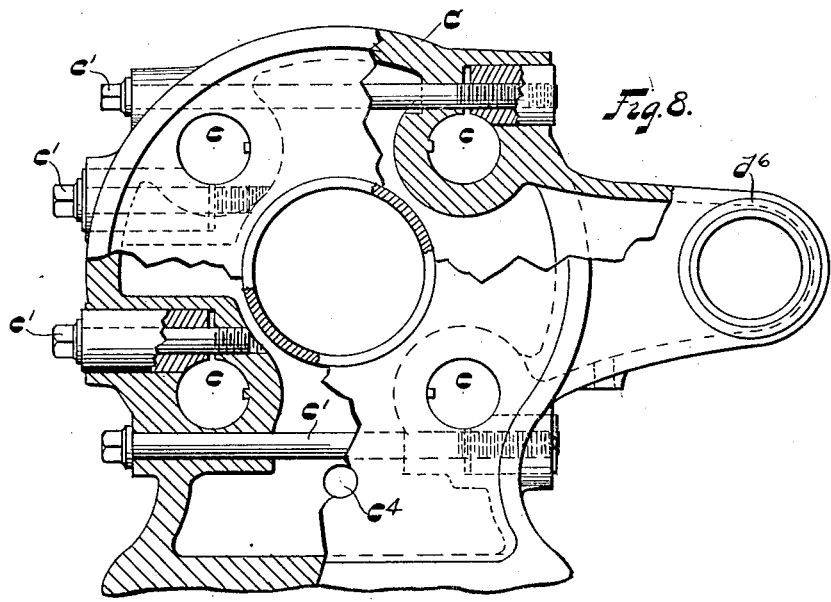
Figure 9:
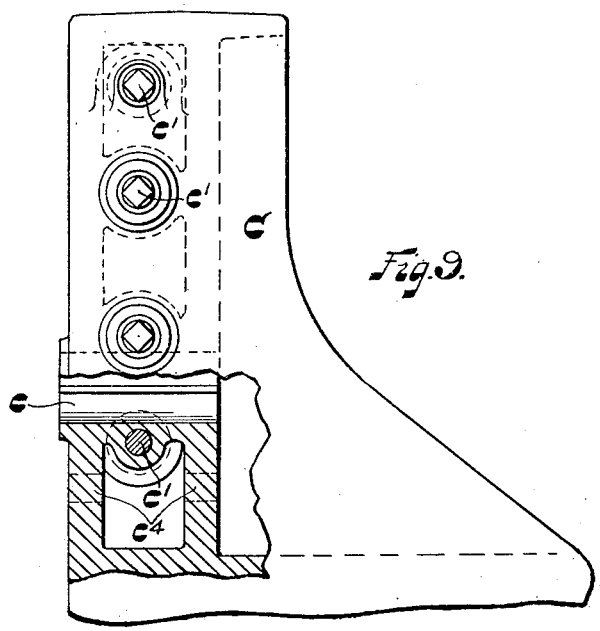

In said annexed drawings: Figure 1 represents a front elevation of a multiple spindle lathe embodying my several improvements, the drive pulley having been omitted from such lathe; Fig. 2 represents a rear elevation on a larger scale of a portion of such lathe, parts being shown in section; Fig. 3 is an end elevation of such lathe as viewed from the right in Fig. 1; Fig. 4 is a vertical transverse cross-section of the same taken on the line 4—4, Figs. 1 and 2; Fig. 5 is a similar vertical transverse cross-section taken on the line 5—5, Fig. 1, certain parts being shown, however, in slightly modified form; Fig. 6 is a vertical transverse cross-section of the spindle-head taken on the line 6—6, Figs. 1 and 2; Fig. 7 is a vertical longitudinal cross-section of such spindle-head taken on the line 7—7, Figs. 5 and 6, certain parts being shown in elevation; Figs. 8 and 9 are elevations of the tool-head as viewed from the right end of the machine, and the front thereof, respectively; Fig. 10 is a view, partly in elevation and partly in cross-section, of a die-holding device that is mounted in said tool-head; Figs. 11 and 12 are respectively a front elevation and a side elevation of the stock-feeding mechanism employed in my lathe, together with the actuating cams therefor; Figs. 13 and 14 are similar views of a modification of such stock-feeding mechanism; Fig. 15 is a plan view of a form of speed-changing mechanism designed especially for my lathe; Fig. 16 is a side elevation, and Fig. 17 an end elevation, of the same, while Fig. 18 is a horizontal longitudinal cross-section thereof taken on the line 18—18, Fig. 16, and Fig. 19 is a vertical transverse cross-section taken on the line 19—19, Figs. 15 and 16; Fig. 20 is a front elevation of a novel form of stock-rest designed for use in connection with my lathe; Fig. 21 is a side elevation of the same shown as being mounted on a stand independent of the lathe-bed; and Fig. 22 is an enlarged cross-section of a detail of such rest taken on the line 22, Fig 20.

An understanding of the general disposition of the parts of my improved multiple spindle lathe may be most easily gained from an inspection of Fig. 1. The bed-frame A, which presents nothing new in the way of design, is suitably supported on legs A' over an oil pan A² which may either be of the removable form shown or be made integral with the bed as desired. The central portion of the upper surface of bed-frame A forms a longitudinally-extending slideway $a$ on which is mounted a slide B, bearing a revoluble spindle-head B'. At one end of slide-way $a$ is a tool-head or stock C either rigidly mounted upon the bed-frame A or, preferably, formed integral therewith, as shown. Spindle-head B' is revolved and the spindles therein rotated, and any rotary tools in tool-head C are operated from a drive-shaft D rigidly mounted with respect to bed-frame A and lying back of slide B and tool-head C. The manner in which such drive-shaft is journaled, as well as its detailed construction, will be taken up later. Motion is communicated to this shaft in part from a cone driving pulley D', Fig. 2, through suitable intermediate gearing and in part from the same pulley through an automatic speed-changing device M, see Fig. 1 again. Reciprocatory motion is communicated to the slide B that bears revoluble spindle-head B', as well as to various other parts, as will hereinafter appear, from a cam-shaft E disposed lengthwise of bed-frame A and turning in suitable bearings $a'$ $a'$. Such cam-shaft E is driven through the same speed-changing mechanism M as is drive-shaft D. Formed integrally with spindle-head slide B, or else securely affixed thereto, is a cross-slide F, which, it is thus seen, is made longitudinally reciprocable of bed-frame A along with such slide B. At the end of slide-way $a$ on the opposite side of spindle-head slide B from tool-head C is stock-feeding mechanism H; and at the extreme end of the bed-frame is mounted a stock-rest K. Where the stock used of such a length as to require it, one or more additional rests, mounted upon suitable strands provided for that purpose, would be positioned in a line with slide B and this rest K. Having thus briefly outlined the salient features of my lathe's structure, I shall now proceed to individually describe the same in their order, so far as possible, and shall then conclude by indicating the manner in which their several operations are coördinated.

The details of the construction of slide B and of spindle-head B' mounted therein appear in Figs. 4 to 7 inclusive, of which Figs. 4 and 5 are a front and rear end elevation thereof, respectively, and Figs. 6 and 7, a transverse and longitudinal cross-section thereof, respectively. From Figs. 6 and 7 it will appear that slide B comprises a casing or housing split in a longitudinal plane and formed with an interior bearing surface $b$ in which the spindle-head B' is journaled. The latter comprises two members $b'$ in the form of heavy flanged disks adapted to close the respective ends of the slide or casing and rigidly secured together by means of arms $b^2$ and screws $b^3$. Equiangularly disposed about the axis of the frame thus made up are apertures $b^4$ in disks $b'$ which form bearings for stock-holding spindles $B^2$. The number of such stock-holding spindles may be varied in different machines according to the character of the work for which such machines are designed. In the one chosen as the basis of this description, four spindles $B^2$ are employed and this, it will be seen, determines in a way the design of the various other mechanisms coöperating therewith. The principle of operation, however, remains exactly the same irrespective of the number of spindles employed.

Stock-holding spindles $B^2$ are, of course, tubular, and each is provided at its forward end with a chuck $b^5$ whereby the stock is normally held against rotation within the spindle. Such chuck is of the type regularly employed in machines of this character; its detailed description is hence held to be unnecessary further than to state that it is operated by means of a tube, $b^9$, Fig. 6, slidably mounted within the spindle and reciprocated to close the chuck in the usual manner by means of bent levers $b^6$ suitably mounted at the rear end of the spindle and adapted to be actuated by a sliding conical collar $b^7$. The natural resiliency of the parts in the chuck tend to open the same upon the removal of conical collar $b^7$ from engagement with levers $b^6$. Collar $b^7$ is provided with an encircling groove $b^8$ that serves as a means for engaging it in turn, as will appear, to periodically open and close chuck $b^5$. To rotate the individual spindles $B^2$, each is provided intermediately of disks $b'$, that go to make up the spindle-head, with pinions $B^3$ that mesh with an internal gear $B^4$. The respective lateral portions of such internal gear $B^4$ are journaled in bearings $b$ within the slide B that are but continuations of the bearings of the spindle-head itself, the upper and lower portions of slide or housing B being formed with an annular recess for the accommodation of an external gear wherewith said internal gear is also provided. This external face of gear $B^4$ engages with a pinion $d$ on a shaft D, Figs. 2 and 6, whereby it, and through it, spindles $B^2$ are driven.

Shaft D, Figs. 2 and 6, comprises primarily an inner shaft $D^2$ that is driven through a sprocket-wheel $d'$ mounted on its other end. On this inner shaft is rotatably mounted a sleeve $D^3$ extending almost the entire length of the shaft; and on the portion of this sleeve that lies directly back of slide B are cut elongated gear teeth that form the pinion $d$ already referred to as driving external and internal gear $B^4$. This sleeve $D^3$ is adapted to be driven directly from cone-pulley D' through gear-wheels $d^2$ $d^3$, the latter of which is rotatably mounted upon such sleeve and is arranged to be connected therewith through a clutch $D^4$. Clutch $D^4$ is actuated to alternately connect and disconnect sleeve $D^2$ with gear $d^3$ by a lever arm $d^4$ that in its turn is rocked by a cam-wheel E' on camshaft E, as will be readily understood from an inspection of Figs. 1 and 2. Shaft D is journaled at the end on which sprocket-wheel $d'$ is mounted in a bearing $d^5$, and again near its center in a second bearing $d^6$ formed in a projection from tool-head C, Fig. 8; while the end that bears pinion $d$ turns in a housing $b^{10}$ similarly projecting from the rear side of spindle-head slide B, Fig. 2. This housing $b^{10}$ is also adapted to receive a pinion $d^7$ that is splined on inner shaft $D^2$, and that is held against endwise movement in said housing so as to be carried back and forth on such shaft, as slide B is reciprocated, by means of a flanged sleeve $d^8$ integral with said pinion and journaled in the housing. This pinion $d^7$ is in this way kept at all times in mesh with a gear $b^{11}$ with which the flange on the outer end disk $b'$ of the spindle-head B' is provided, Figs. 5 and 7.

From the construction and connections of drive-shaft D it is apparent that, through sprocket-wheel $d'$ and inner shaft $D^2$ upon which it is mounted, spindle-head B' may be revolved, or indexed, within slide B as desired; and that through sleeve $D^3$ and the elongated pinion $d$ formed thereon the several stock-holding spindles $B^2$ within said head may be rotated independently of the revolution of the head as a whole; while both said operations are unaffected by the reciprocatory movement of slide B, and with it of spindle-head B', along bed-frame A. The latter of said two operations, that is, the rotation of the spindles $B^2$, is intermittent, being dependent upon clutch $D^4$. This single clutch, it will be observed, however, serves to throw the entire set of spindles into operation or out, as desired. The second operation, the indexing of the spindle-head, is also designed to be intermittent and by virtue of the construction whereby sprocket-wheel $d'$ is driven, is designed to progressively revolve such head through an angular distance equal to half that between successive spindles; or, in the case in hand, to revolve such head one-eighth of a revolution at a time.

A spring-actuated bolt $b^{12}$, Fig. 6, mounted in the side of slide B and transversely of the axis of spindle-head B', is adapted to lock such head against revolution at the end of each alternate partial revolution by engagement with sockets $b^{13}$ in the head. The number of sockets $b^{13}$ would hence be, obviously, the same as the number of spindles in such head, and they are made slightly tapering, as is also the end of bolt $b^{12}$, whereby the accuracy of the indexing movement is assured; since, even though the spindle-head be a trifle out of place, the effect of the engagement therewith of bolt $b^{12}$ will be to force it exactly into position. Bolt $b^{12}$ is adapted to be actuated to release said head by a bent lever $b^{14}$ pivotally mounted adjacent thereto, one arm of which engages such bolt's outer end, the other arm of which bears a roller $b^{15}$ adapted, as slide B is reciprocated, to travel on an inclined way or cam-track $b^{16}$, formed in the front of bed-frame A. The conformation of this way or track is such as to leave spindle-head B' free to be revolved by shaft $D^2$ at all times except when it occupies its advanced position. A handle $B^5$ attached to bent lever $b^{14}$ permits the latter to be manually rocked if it be desired to release the head when in its advanced position. Reciprocation of slide B whereby spindle-head B' is advanced and retracted and bolt $b^{12}$ thus actuated is brought about by means of a cam-drum $E^2$ of any approved type, that is mounted upon cam-shaft E and engages a stud $b^{17}$ projecting downwardly from the slide, Figs. 1 and 6, and bearing a roller at its end.

Operation of the previously described chuck-actuating mechanism, with which each spindle is provided, is intended to be effected on successive spindles at a time when the spindle-head occupies its retracted position. Two slightly different devices are shown in the drawing for accomplishing this result. The first, shown in Fig. 1, comprises simply a secondary slide P mounted in the base of turret-head slide B and adapted to be reciprocated longitudinally of said slide B by a segmental cam-drum $E^3$, splined on cam-shaft E and carried back and forth along such shaft in unison with the movements of slide B by means of a forked arm $b^{18}$ projecting downwardly from the latter. I desire to direct particular attention to this arrangement of cam $E^3$; the advantages afforded thereby will be set forth more fully later in connection with another similarly mounted cam. Secondary slide P is provided, Fig. 1, with an upwardly projecting arm $p$ that is so disposed as to successively engage the grooves $b^8$ of conical chuck-actuating collars $b^7$ mounted on the rear ends of the spindles, as the latter are successively positioned directly beneath the spindle-head's axis, in the course of the latter's revolution. With the parts relatively disposed as shown, this would be just after the spindle-head has been turned to occupy one of its intermediate angular positions. Cam $E^3$ is arranged to engage and reciprocate secondary slide P pending the engagement of its arm $p$ with successive collars $b^7$ in the manner just set forth. Each such collar is thus actuated in turn to first open the corresponding chuck $b^5$, then close it again. A second form of device for performing this same function is illustrated in Fig. 5. Instead of using a secondary slide, I may employ, as shown here, a lever R pivoted near its center on a suitable boss formed on the base of spindle-head slide B. The lower end of this lever bears a roller $r$ that is adapted to be successively engaged by cams $e\ e'$ on a wheel $E^4$ that is splined on camshaft E and connected with slide B by an arm $b^{18}$ in the same fashion as is cam-wheel $E^3$. The upper end of lever R bears a stud $r'$ adapted to engage the groove $b^8$ of successive collars $b^7$ just as arm $p$ of the first device, except that it is positioned to effect such engagement while the spindle-head occupies one of its normal angular positions. The cams $e$ $e'$ on wheel $E^4$ are of course arranged to rock the lever R and to thereby reciprocate collar $b^7$ to open and close the corresponding chuck $b^5$ pending such engagement, as before. During the brief interval that the chuck of each spindle is thus in succession held open by one form or other of device as above set forth, the stock in such spindle is fed forward by the mechanism now to be described. And for this operation, also, I show two slightly different mechanisms respectively designed to be used in conjunction with type P and type R chuck-actuating device. The one to which I would first call attention is the one designed for use with the first of said types and shown in connection therewith as H in Fig. 1; and again in enlarged detail view in Figs. 11 and 12. On referring to such figures it will be seen that the device comprises a base member H' slidably mounted longitudinally of the bed-frame A in a suitable slide-way $a^2$ at the left end of the machine. Reciprocation of such member H' is periodically effected by the engagement with a stud $h^5$ pendent therefrom of a segmental cam-drum $E^5$ fixedly mounted on cam-shaft E. A forked arm $h$ projecting downwardly from the forward end of member H' engages a sleeve $E^6$ that is splined on the same cam-shaft E and bears an adjustable cam-disk $E^7$ of novel construction.

It is evident from the construction just described that, as member H' is reciprocated by cam $E^5$, sleeve $E^6$ bearing cam $E^7$ will be carried back and forth in unison with such slide although its rotation with cam-shaft E is in nowise interfered with. This arrangement of cam $E^3$ and slide H' and the one employed in connection with chuck-actuating mechanism P are in all respects similar; another example of the same sort will be found in connection with the cross-slide mechanism to be described later. By means of it I am enabled to use a simple disk cam in place of a cam-drum with a cam-plate having a combined helical and spiral cam-surface such as would otherwise have to be employed when it is desired to derive from a rotating shaft transverse reciprocation of a member within a member that is itself longitudinally reciprocated from the same shaft. Similarly to secure longitudinal reciprocation of such first member a cam-drum with much shorter helical plates than would otherwise be required can be employed. At the forward end of base member H' of such stock-feeding device H is formed a vertical slide-way $h'$, Fig. 12; in this slide-way is fitted a plate or block $h^2$ normally depressed by a spring $h^3$ so as to occupy a position in the lower part thereof. The cam-disk $E^7$, borne by sleeve $E^6$, is adapted to periodically engage a roller $h^4$ mounted on the face of block $h'$ and elevate the same against such spring $h^3$. In addition to this roller, block $h^2$ bears centrally mounted on its face tongs $H^2$ having jaws fitted with adjustable gripper-members $h^6$. A bolt $h^7$, transversely mounted in the upper end of such tongs, and springs $h^8$ coacting therewith, tend normally to close the jaws of the tongs to frictionally grip the stock S when the latter lies between them. The reins $h^9$ of the tongs have their lower ends beveled as shown, Fig. 12, and are so disposed as to be engaged by pins $h^{10}$, mounted on slide-way $h'$, when the block $h^2$, on which such tongs are mounted, is depressed by spring $h^3$; the effect of such engagement being to open the jaws of the tongs against the action of springs $h^8$ and to thus free the stock S. It is hence seen that the movement of block $h^2$ upwardly by cam $E^7$ raised tongs $H^2$ a certain distance above member H' and the top of the bed-frame at the same time freeing the reins $h^9$ from pins $h^{10}$; thereupon the jaws of such tongs automatically close; as soon as cam $E^7$ has passed by, however, the block is again depressed by spring $h^3$ and such jaws again opened.

The moment when the upward movement of the tongs and consequent gripping of the stock occurs depends upon the angular position of cam $E^7$ upon sleeve $E^6$. This position I make a matter of very exact adjustment by cutting a worm-gear $e^3$, Fig. 12, about that portion of the periphery of such sleeve as is inclosed by the sleeve $e^7$ proper of the cam, and then mounting transversely in the latter sleeve a short worm $e^4$ meshing with such gear $e^3$. One projecting end $e^5$ of this worm is squared to receive a key or wrench; the other end, which also projects without the sleeve is threaded to receive a nut $e^6$ whereby the worm, once it is positioned, may be securely locked in place. The length of time during which the stock remains thus gripped by the tongs, depends, of course, upon the length of the contacting surface of cam-disk $E^7$. Such surface is cut upon the arc of a circle and is formed by the outer edges of a plurality of segmental disks $e^8$, there being two illustrated in Fig. 12 of reference. One of these disks is made integral with cam-sleeve $e^7$; the others are rotatably mounted upon such sleeve $e^7$ and are adapted to be adjustably secured together and to such fixed disk by set screws $e^9$ mounted as shown. In this way, by the use of a sort of reversed "iris diaphragm", as it were, I can readily lengthen or shorten the contacting edge of the cam as desired.

It should be clear, from the above description, that chuck-actuating mechanism P and stock-feeding device H are both designed to operate when slide B occupies its retracted position. The assumption of such position by the slide, it has been explained, is accompanied by a partial revolution of the spindle-head mounted therein; such partial revolution brings one spindle into position directly below the axis of the spindle-head and at the same time effects the engagement of the grooved conical collar $b^8$ with the centrally-positioned, upwardly-projecting arm $p$ of slide P. The latter being thereupon reciprocated in a forward direction by cam-drum $E^3$, the chuck of such spindle is opened. In the meantime, stock-feeding device H has been retracted by cam-drum $E^5$ to its rearmost position, and at this juncture stock-gripping-tongs $H^2$ are raised to inclose and automatically grip the stock. The chuck of the spindle still continuing open, device H while thus gripping the stock is next advanced to its forward position by cam-drum $E^5$ and carries the stock with it until the latter contacts with a suitable stop therefor provided in the tool-head, as will be presently described. The stock being frictionally held by device H, the further movement of the latter is not interfered with as the gripping members $h^6$ of tongs $H^2$ will simply slide along such stock. However, by a proper adjustment of cam-disk $E^7$, the device can, and should, be set to release the stock the moment it has been advanced the required amount by allowing the gripping member to drop, and any unnecessary friction and wear thus avoided. As soon as the stock has been in this manner advanced, cam-drum $E^3$ moves collar $b^7$ back into position to again lock the chuck and another partial revolution of the spindle-head carries the spindle under consideration away and out of engagement with the chuck-actuating device P. A third partial revolution brings the next spindle into such relation, and so on, alternate partial revolutions bringing successive spindles into position to permit the stock-feeding device to advance the stock held therein.

In Figs. 13 and 14 I illustrate a modified form of stock-feeding device; and, just as the above described form was shown as being adapted to coöperate with the P type of chuck-actuating means shown in Fig. 1, so the form now to be taken up is shown as adapted to coöperate with the R type of chuck-actuating mechanism, shown in Fig. 5. However, for that matter, either stock-feeding device may be employed with either type of chuck-actuating mechanism with no other change from the construction shown than a slight rearrangement of parts. Thus, while type P of chuck-actuating mechanism, as shown, is stationed to engage collars $b^7$ of successive spindles as the latter occupy normal positions, by which I mean positions corresponding with a locked position of the spindle-head, such mechanism might be stationed to make such engagement as the spindle-head, in the course of its revolution, occupies a position intermediate of two normal positions. The station of feeding-device T would have to be correspondingly shifted to substantially the center line of the lathe-bed. Similarly chuck-actuating mechanism P and stock-feeding device H might be stationed to operate in conjunction with a spindle occupying a normal position instead of being stationed centrally as shown and described. Aside from these changes in position, the operation of the several parts would, of course, require to be differently timed, depending upon the manner in which they were combined and how they were stationed.

The modified form of stock-feeding device of Figs. 13 and 14 comprises, as does the one first described, a base-member, designated by T, and stock-gripping means mounted thereon so as to be movable transversely thereof. Base member T, however, as shown, is not longitudinally reciprocable along the top of bed-frame A, but is, on the contrary, fixed thereto; while the stock-gripping means are positioned on said member as before by cam-disk $E^{18}$. Such base-member is formed on its upper face with a slide-way $t'$, shown as being inclined, although not necessarily so constructed. In this slideway is mounted a block $t^2$ that has a rack $t^3$ on its under side; and pivotally mounted on the under-side of base T is a bell-crank $t^4$, one arm of which projects upwardly and bears a segmental gear $t^5$ that meshes with such rack $t^3$. The other arm of the bell-crank bears a roller $t^6$ that is adapted to contact with the edge of cam-disk $E^{18}$, whereby, as such disk rotates with shaft E, it is evident that block $t^2$ will be reciprocated, the weight of the block serving to maintain the roller $t^6$ at all times in operative contact with such disk. On its upper face block $t^2$ is provided with a pair of ears $t^7$ between which are pivotally mounted two short levers $t^8$ provided at their upper ends with adjustable gripper members $t^9$. A member $t^{10}$ of elliptical or equivalent cross-section is also pivotally mounted on the upper face of block $t^2$, being so disposed as to lie between the lower ends of the levers $t^8$. In its normal position member $t^{10}$ is designed to lie flat-wise between such lever-ends, thus permitting the gripper-bearing ends to open. By rotating such member, however, through a quarter of a turn, it will obviously cause such ends to close by spreading the ends between which it lies. Oscillation of the member $t^{10}$ to effect this result is periodically effected by the engagement of a finger $E^{15}$ mounted on cam-shaft E with a rock-arm T² mounted on one end of the member and provided with a pin $t^{11}$ projecting laterally into the path of such finger. When a piece of stock S lies between the gripper-ends $t^9$ of levers $t^8$, the adjustment is designed to be such that member $t^{10}$ will be frictionally held in the position in which finger $E^{15}$ leaves it. To release it from such position a bent-lever or trip $t^{12}$ is arranged to engage a pin $t^{13}$ projecting from arm T² when properly actuated by a finger $E^{16}$ as will be readily understood. Fingers $E^{15}$ and $E^{16}$ are both mounted upon a collar $E^{17}$, Fig. 13, about which they are angularly adjustable so as to time the several operations performed by them as may be desired. With respect to cam-disk $E^{18}$, the adjustment of the fingers should be such as to effect both the closing and the opening of the gripper-ends of levers $t^8$ during the time that such levers are elevated by the action of the cam-disk. The angular position of the latter as well as the adjustment of the fingers within the limits noted depend upon the operative relations that this device as a whole has with the stock-holding mechanism, i. e. with the spindle-head B' and the spindles rotatably mounted therein. In this connection it will be remembered, see Fig. 5, that at all times the chuck-actuating collar $b^7$ of some one spindle B² is in engagement with mechanism R whereby such collar is operated. Where the above-described type T of stock-feeding mechanism is employed, mechanism R is arranged to operate such collar $b^7$ to open the spindle-chuck corresponding therewith, when the retraction of the spindle-head slide begins. At the same time cam $E^{18}$ raises the gripping device of feeding mechanism T into operative relation with the stock in the spindle under consideration and thereupon finger $E^{15}$ actuates such device to firmly grip the stock until finger $E^{16}$ comes into play and in turn opens the gripping device. Accordingly it is seen that while the spindle-head and spindle are being retracted the stock in the latter is held stationary for the interval between the operation of the two fingers, and is thus, in effect, advanced or fed through the spindle. The amount thus fed forward is gaged by the adjustment of the fingers, and as soon as the gripping device releases its hold, mechanism R may again effect the closure of the spindle's chuck. By this time the gripping device T is entirely withdrawn from the stock and the spindle-head may be revolved to bring another spindle into operative relation with such device and with mechanism R. Only an approximate gaging of the length of the stock thus fed forward is possible by means of the adjustment of fingers $E^{15}$ and $E^{16}$ above set forth. A stop has to be provided as in connection with the other device to accurately effect such gaging, and along with such stop it may prove desirable to impart to the feeding-device T a slight reciprocatory movement. This stop, however, instead of being alined with a spindle occupying an intermediate angular position as is the one illustrated, would have to be similarly reciprocably mounted in a tool-holding pocket of tool-head C in conjunction with the tool occupying the same position. Since the stop does not form in either case a part of my invention, being in fact of familiar design, I show the one arrangement thereof only.

Because of the manner of its operation, device T is really more appropriately termed a stock-gripping device simply, since it serves to feed stock only in conjunction with the reciprocation of the spindle-head. This is the only point that distinguishes it from the device first-described above; such first-described device by being held stationary could be made to operate the same as this one, and, vice versa, this one by being made reciprocable, could be made to operate the same as the first device.

Inasmuch as the stock must be free not only to move forward under the action of the stock-feeding mechanism, but must also accompany the spindle-head in its revolution and reciprocation, I have found it necessary to devise a form of stock-rest K to meet these conditions, Figs. 20, 21 and 22. As has already been indicated, I may employ as many of these rests K as the length of stock in use makes necessary, the first being supported at the extreme left end of the bed-frame A, Fig. 1, the others on suitable stands K' shown in dotted outline, Fig. 21. Each such rest comprises an annular frame K² having a suitable base $k$, and a revoluble member K³ supported on ball-bearings $k'$ within such frame K². In this member K³ is a series of apertures $k^2$ in which the stock is intended to lie and through which it moves longitudinally as the spindle-head reciprocates and the stock-feeding device operates. The number of such apertures and their disposition is, of course, made to correspond with that of the spindles in the spindle-head. When the spindle-head revolves, the entire frame K³ revolves in unison with it in frame K². But little additional force is required to effect such revolution by virtue of the ball-bearings $k'$ which practically eliminate all friction. The movement of the stock in the apertures is likewise considerably facilitated by the employment of ball-bearings in the manner clearly appearing in Fig. 22. Around the edge of each such aperture a double race-way $k^3$ $k^3$ is formed by means of a flanged sleeve $k^4$, a partition $k^5$ and an annular retaining plate $k^6$. In such race-way are retained anti-friction steel balls $k^7$ of such a diameter as to project slightly within the opening. The stock accordingly is, in ll positions of the revoluble member $K^3$, resting in effect on ball-bearings and the endwise movements thereof previously indicated as accompanying the operation of the machine are capable of being effected promptly and with the expenditure of little energy.

All the mechanism thus far described may be inclusively designated as stock-holding and feeding means. By it I am enabled to alternately advance and retract longitudinally a plurality of rods or other pieces of stock; to rotate the same individually as desired; to intermittently progressively revolve them as a whole about a common axis so as to cause each one to occupy in turn a definite angular position, or series of positions, with reference to such axis; and to successively feed each such piece of stock forward a predetermined amount. In other words, by opposing to such stock a set of rigidly-mounted tools, preferably equal in number to that of the spindles wherein such stock is held, I am enabled to bring in turn each piece of stock into operative relation with each tool and to simultaneously perform successive operations on different pieces of stock. The tools referred to are mounted in suitably formed and disposed tool-holding pockets $c$ in the fixed tool-head C, Figs. 1, 8 and 9. Aside from its being rigidly attached to the bed-frame A, the only novel feature in such tool-head is the disposition of lock bolts $c'$ whereby the tools are locked in aforesaid pockets $c$. These all lie horizontal and are arranged so as to bring their heads together on the front side of the tool-head where they are most readily accessible. Ordinarily they are arranged so as to project at points adjacent to the corresponding pockets and those in the rear are gotten at only with much difficulty. The stop $C^2$, Fig. 1, which is utilized in connection with the stock-feeding device H, as has been before indicated, to accurately gage the length of stock advanced thereby, comprises simply a rod fitted to an aperture $c^4$ in the tool-head. Such rod is adjustably mounted on a slide $c^2$ longitudinally reciprocable on the top of bed-frame A. Movement of the slide $c^2$ is effected at stated intervals by means of a segmental cam-drum $E^9$ of the usual form that is adapted to engage a stud $c^3$ projecting downwardly therefrom. The object in having the stop thus reciprocable, it will be of course understood, is to permit its retraction at all times except when actually in use. Cams $E^5$ and $E^9$ are accordingly timed to simultaneously feed the stock forward and to advance the stop. The rod forming the stop proper, being adjustably mounted on the slide, may be made to occupy any desired position when advanced, and the length of stock fed forward is regulated thereby.

No tools are shown as being mounted in tool-head C in any of the figures since both the character and disposition of such tools necessarily varies with each job. A die or tap for cutting threads, however, almost invariably forms one of these tools and for this reason I have devised a die or tap holder, Figs. 1 and 10, for use in conjunction with aforesaid tool-head. This holder is designed particularly for use with a self-opening or self-releasing thread-cutting tool and comprises adjustable means for regulating the length of thread to be cut. As shown in said figures, it is fitted in the lower right-hand pocket of the tool-holder C, viewing the latter as shown in Fig. 8. It consists essentially of a spindle $c^5$ slidably but non-rotatably held in such pocket and provided with two collars $c^6$ in which two supplementary guide rods $c^7$ are mounted one in each side. These rods slide in apertures formed to receive them in head C, and one of them is threaded for about half its length from the rearmost of collars $c^6$. A nut $c^8$ is adjustably positioned along such threaded portion. The rear end of spindle $c^5$ is slidably mounted in a reciprocatory member $C^4$ mounted on bed-frame A like the slide $c^3$ whereby stop-rod $C^2$ is actuated, and like it provided with a downwardly projecting stud $c^9$, that is periodically engaged by a segmental cam-drum $E^{10}$ on cam-shaft E. Spindle $c^5$ and reciprocatory member $C^4$ are held against disengagement by means of a collar $c^{10}$ secured to the extreme end of the former, and intermediately of said member and the nearest of collars $c^6$ is interposed a helical spring $c^{11}$. This spring is stiff enough to properly move the tool-holder forward upon the stock as member $C^4$ is advanced by cam $E^{10}$ until nut $c^8$ on guide-rod $c^7$ contacts with the head whereby such movement is arrested, further advance of the slide resulting simply in a compression of the spring. By varying the position of nut $c^8$ on such rod the amount of forward movement given the tool-holder can obviously be adjusted to cause any desired length of thread to be cut.

In case it is desired to fit a rotary tool, as a drill, in the tool-head, a holder therefor may be readily mounted upon the bed-frame in a manner similar to that just described, and suitable driving connection made with back shaft D.

Additional provision for tools over that afforded by tool-head C is made in cross-slide F, Figs. 1, 3 and 4, already referred to as differing from the familiar construction of slide in that it is longitudinally reciprocable along bed-frame A. In fact, I prefer to cast the base-member F', in which such slide is mounted, integral with spindle-head slide B, in order that the slide may be held perfectly rigid with respect to said spindle-head. I furthermore preferably employ two independent cross-slide members $F^2$, $F^3$, Fig. 4, which are mounted most conveniently in a single transverse slideway, one on each side of the center line of the machine. These slide-members are provided with suitable tool-holding means, not shown, on their upper faces, as will be readily understood, and they are normally retained in a position removed as far as possible from such center line by springs $f^2 f^3$ respectively; movement thereof inwardly is periodically effected by means of bent levers $F^4 F^5$ pivotally mounted on the underside of base $F'$ and bearing on their upper ends toothed segments $f f'$ respectively meshing with racks $f^4 f^5$ on the corresponding slide-members. These racks $f^4 f^5$ are in fact worms that are mounted in suitable bearings in the ends of the slides so as to be rotatable but held against endwise movement therein, and the teeth of segments $f f'$ are of course cut to correspond therewith. The outer ends $f^7 f^8$ of such worms $f^4 f^5$ are prolonged so as to project a short distance without the slides and are squared, as shown, to receive a wrench whereby the worms may be rotated when desired and the position thereof relatively to segments $f$ and $f'$ so varied as to throw the slides inwardly as desired when levers $F^4 F^5$ are rocked. Even a coarse worm employed in this connection will admit of quite exact transverse adjustment of the tool borne by the slide-member while any degree of refinement may be introduced into such adjustment by the use of a worm of less pitch. Graduations on a sleeve $f^6$ mounted on the projecting end of each worm, in connection with a zero-mark on the adjacent surface of the worm's bearing, afford means for measuring such adjustment.

Rocking of lever-arms $F^4 F^5$ and consequent actuation of tool-bearing slide-members $F^2 F^3$ in the manner described is effected by the engagement of cam-disks $E^{11}$ and $E^{12}$, Figs. 1 and 4, with the lower ends of said arms respectively, such lower ends being provided with rollers as usual. Cam-disks $E^{11}$ and $E^{12}$ are angularly adjustably mounted on a sleeve $E^{13}$ splined on cam-shaft E and adapted to be carried back and forth along the same as spindle-head slide B, and with it cross-slide F, are reciprocated on slide-way $a$, the construction being similar to that previously described as being employed in connection with cams $E^3$ and $E^7$. By varying the angular positions of cams $E^{11}$ and $E^{12}$ upon sleeve $E^{13}$ the reciprocations of slides $F^2$ and $F^3$ may be independently regulated; such reciprocation, it will also be noted, is entirely independent of the movements of the spindle-head slide. To translate the upward movement given the inner end of arm $F^5$ by the corresponding cam $E^{12}$ into an inward movement of slide $F^3$, it is obviously necessary to introduce an additional geared member $F^7$ between the toothed segment on the upper end of such arm, and the worm rack $f^5$ in such slide. Previous reference to toothed segment $f'$ as being a part of arm $F^5$ is hence correct only by assuming this member $F^7$ to be functionally a part of the lever arm, as it may truthfully be said to be.

By virtue of the novel construction of cross-slide set forth, I achieve two desirable results. In the first place, since the spindle-head $B'$ and the tool-bearing members of the cross-slide are mounted in the same integral frame or base-member, the spindles in such head and the tools on such slide-members are held rigidly in place with respect to each other, thus insuring an accuracy of operation not attainable were the spindle-head slide and cross-slide separate. In the second place, the operation of the tools of the cross-slide can commence in either the retracted or advanced position of the spindle-head slide and may continue if found desirable during the reciprocation of the same. Thus where, as would be usually the case, one of such tools is a forming tool and the other a cutting-off tool, the operation of the forming-tool could begin with the advance movement of the spindle-head slide and be over by the time such movement was completed; and the cutting-off tool could operate pending the retraction of such slide. There would thus not only be an economy in time effected, but there would be no possibility of interference between the tools of the cross-slide and those mounted in the tool-head C, proper.

It has been already indicated in a general way how motion of all the parts of my lathe is derived through suitable gearing from a single cone drive-pulley $D'$, Figs. 2 and 3; such gearing, it was further seen, aside from the direct drive of sleeve $D^3$ which forms that part of shaft D whereby the spindles $B^2$ are rotated, includes a speed-changing mechanism M, Figs. 1 and 3. Such speed-changing mechanism may be of any approved form, there being a number of satisfactory devices at present in use that can be readily adapted to the situation here presented. However, I have devised, and here show in Figs. 15 to 19 inclusive of the drawings, a form of device especially designed for use in connection with my lathe, and hence embodying a number of novel features. Such mechanism includes a short horizontal secondary driving-shaft $M'$, journaled at $a^4 a^4$, and bearing a sprocket-wheel $m$ directly connected by means of a sprocket chain $m'$ with a sprocket-wheel $d^9$ keyed on the same shaft as drive-pulley $D'$, Figs. 2, 3 and 15. Adjacent to such secondary driving-shaft $M'$ and parallel therewith is a second shaft $M^2$ journaled in bearings $a^5 a^5$ and extending into proximity with another shaft $M^5$ disposed transversely across the end of the machine. Shaft $M^3$ bears a worm $m^3$ that engages a large worm-gear $E^{14}$ on the end of cam-shaft E and so serves to rotate the latter; while bevel gears $m^4$ $m^5$ rotatively mounted on the adjacent ends of shafts $M^2$ and $M^3$, respectively, serve to operatively connect the latter to the former. On the other end of shaft $M^2$ is rotatably mounted a sleeve $m^6$, Fig. 18, that is connected with aforesaid secondary drive-shaft $M'$ by means of a nest of gears, six as shown, see Fig. 16, the three upper $m^7$ of which are fast on drive-shaft $M'$, while the three lower ones $m^8$ are adapted to be consecutively rotatively connected with sleeve $m^6$ by means of a sliding rod $M^4$ lying within the said sleeve and bearing a key $m^9$. The projecting end of rod $M^4$ is provided with a knob $m^{10}$ whereby key $m^9$ may be readily positioned to cause the sleeve $m^6$ to be driven through any desired combination of gears $m^7$ and $m^8$.

Shaft $M^2$ has a squared portion $m^{11}$, Fig. 18, intermediately of sleeve $m^6$ and bevel gear $m^5$, upon which is slidably mounted a clutch $M^5$ centrally encircled by a groove $m^{12}$ that is engaged by the end of a rock-arm N. By means of such rock-arm the clutch may be shifted to engage either a worm $m^{14}$ that is keyed on the inner end of said sleeve $m^6$, or a sleeve $m^{15}$, on the opposite side of such squared portion $m^{11}$, upon which is mounted a bevel gear $m^{16}$. Bevel gear $m^{16}$ is operatively connected at all times with sleeve $m^6$ through a second bevel gear $m^{17}$, spur gears $m^{18}$ and $m^{19}$, and a worm gear $m^{20}$, which last meshes with worm $m^{14}$, Figs. 16 and 17. When the clutch is shifted by arm N to engage the end of worm $m^{14}$, shaft $M^2$, it is apparent, will be rotatively connected with sleeve $m^6$ and driven at the same relatively high rate of speed. When, however, the clutch is made to engage the sleeve $m^{15}$ bearing bevel pinion $m^{16}$, such shaft $M^2$ will be driven at a relatively low rate of speed, the ratio of which to such high speed depends upon the intermediate gearing.

Bevel gear $m^5$, Fig. 18, at the outer end of shaft $M^2$, is provided with an elongated integral collar $m^{21}$ that abuts on sleeve $m^{15}$. On such collar is rotatably mounted between annular friction-disks $m^{22}$ a sprocket-wheel $M^6$, that is connected by means of a sprocket-chain $m^{33}$, Fig. 3, to drive sprocket-wheel $d'$ on the end of shaft $D^2$. Friction-disks $m^{22}$ being rotatively mounted on such sleeve and being furthermore held against wheel $m^{23}$ with any desired degree of pressure by means of a nut $m^{24}$ and lock nut $m^{25}$, it is clear that such wheel will normally rotate with bevel-gear $m^5$ and shaft $M^2$. Such rotation is permitted, however, only at stated intervals and for stated amounts, the sprocket-wheel being locked at all other times by the engagement of a spring-actuated bolt or stop $N'$ with a notched wheel $M^7$ that is formed integral with the sprocket-wheel.

From the construction of the speed-changing mechanism M, as thus far set forth, it will follow that for each step in cone drive-pulley $D'$, one can obtain for shaft $M^2$ three different relatively high speeds and three different relatively low speeds depending in the first place upon which of nested gears $m^8$ is keyed to sleeve $m^6$ and in the second case upon whether clutch $M^5$ engages such sleeve or bevel-gear $m^{16}$. At the same time, shaft $D^2$ will be periodically driven by sprocket-wheel $M^6$, which latter will rotate at the same speed at which such shaft chances to be driven when bolt $N'$ is withdrawn. The position of the driving belt on cone-pulley $D'$, and of key $m^9$ relatively to gears $m^8$, of course remain unchanged so long as the machine is working on any one job; the arm N, however, whereby clutch $M^5$ is shifted, as also bolt $N'$ whereby sprocket $M^6$ is controlled, are automatically periodically operated during the progress of such operation by the following means. Arm N is mounted on the end of a short transversely disposed rock-shaft $n$, Fig. 18, that is adapted to be oscillated by a reciprocatory rod $N^2$ disposed at right angles thereto. Assumption, by such shaft, of the neutral position shown in the figures whereby clutch $M^5$ is held out of engagement with both sleeve $m^6$ and sleeve $m^{15}$, is normally prevented by a spring-actuated pin $n^3$ mounted in an arm $n^4$ on such shaft, and adapted to swing such arm either to one side or the other of a wedge $n^5$. A spring $N^3$ normally positions rod $N^2$, and thereby rock-shaft $n$, to effect the high-speed connection of clutch $M^5$ with sleeve $m^6$; but by means of the periodic engagement of a cam-faced stud $e^9$ on the face of large worm-gear $E^{14}$ with an arm $n'$, Figs. 15 and 17, on the outer end of rod $N^2$ the latter is temporarily actuated to shift clutch $M^2$ into engagement with sleeve $m^{15}$. The occasions when the change from high speed to low speed, and vice versa, is made, can be most clearly indicated in a description of the general operation of the machine and will hence not be noted at this time.

The position of spring-actuated bolt $N'$, whereby notched wheel $M^7$, and sprocket $M^6$ therewith connected, are ordinarily locked against rotation, is clearly shown in Figs. 15 and 17. Such bolt is periodically retracted, so as to release said wheels with the result already noted, by the engagement of a pin $e^{11}$, projecting inwardly from worm-gear $E^{14}$, with the upper end of a short lever arm $n^2$, the lower end of which is rounded and fits in a recess in the rear end of said bolt. Pin $e^{11}$ is adjustably secured in a circular groove on the inner face of gear $E^{14}$ in the usual manner, and the release of notched wheel $M^7$ is thus regulated as desired. The bolt $N'$ need be withdrawn but for a moment, inasmuch as rotation of wheel $M^7$ begins immediately, and once begun will continue until a second notch is brought into position to be engaged by the bolt. The number of notches in such wheel depends in the first place upon the amount of angular movement it is desired to give the spindle-head B', since, as it will be recalled, the function of shaft $D^2$, which is rotated by the mechanism under consideration, is to index such spindle-head; such number depends in the second place, of course, upon the relative ratios of the two sprockets, the pinion on shaft $D^2$, and the gear on the spindle-head. In the machine illustrated there are two such notches, the arrangement of intermediate gearing being such that a half-turn of sprocket $M^6$ serves to rotate the spindle-head through one-eighth of a revolution. Since there are two such partial revolutions given to the head B' pending each reciprocation of the slide B in which it is mounted, and since such slide is reciprocated back and forth once with each turn of cam-shaft E and of worm-gear $E^{14}$, there will obviously have to be two pins $e^{11}$ provided on the face of the worm-gear $E^{14}$ whereby the shaft is rotated. Where chuck-actuating mechanism of the type P is employed, the angular positions of pins $e^{11}$ about the axis of wheel $E^{14}$ will have to be adjusted so as to time each pair of partial revolutions of the spindle-head to occur while the latter occupies its retracted position, in order that such chuck-actuating mechanism may be successively engaged and then disengaged in the manner previously set forth. Where the other, or R type, of chuck-actuating mechanism, Fig. 5, is used, in combination with the stock-feeding device shown in Figs. 13 and 14, both partial revolutions must occur during the advance movement of the spindle-head or upon the completion of such movement, and they may be consecutive. In other words, the spindle-head, with this type of feeding-device, is preferably revolved by quarter-turns instead of by eighth-turns, and the notched wheel $M^7$ is accordingly modified to permit sprocket $M^6$ a full instead of only a half rotation.

When it becomes necessary to adjust any of the various parts of the machine, clutch $M^5$ is secured in its neutral position by means of a hand-lever $M^8$ mounted on the front of the machine, Fig. 1, and suitable connecting mechanism, not shown. The cam-shaft and back-shaft D may then be rotated by means of a crank $M^9$ operatively connected by sprocket and chain, or otherwise, with transverse shaft $M^3$. In this way the correct timing of the several operations that enter into the general operation of the machine may be empirically determined and the requisite adjustments made.

It may be well to indicate, by way of summary, what such general operation involves, for although in connection with the description of each of the elements of my lathe I have endeavored to set forth the manner of operation of such particular part, it has been necessary to defer until after all these parts have been so described a statement of the manner in which their operations are correlated to produce one harmonious result. I shall assume for the purpose of this general description that the proper tools have been fitted in the pockets of tool-head C as also in the two independent slide-members of cross-slide F. These latter tools will generally comprise a forming-tool on one side and a cutting-off tool on the other. I shall also assume that the drive-belt has been connected with cone-pulley D' and that key $m^9$ has been positioned in nested gears $m^8$ to produce the relative high and low speeds, obtainable by the shifting of clutch $M^5$, that are compatible with the highest operative efficiency of the several tools referred to. I shall finally assume that the several cams upon shaft E have been adjusted to correctly time the periodic movements effected thereby. Then, commencing with slide B in its advanced position, as shown in Fig. 1, cam-drum $E^2$ will next retract such slide. Either just before or pending such retraction cross-slide member $F^3$ bearing the proper tool for such purpose is actuated to cut-off the finished article on the stock in stock-holding spindle $B^2$ adjacent thereto. By the time that the retraction of the slide has been accomplished, stop N' will have been withdrawn from engagement with notched wheel $M^7$, and spindle-head B' will have been given a partial turn, one-eighth of a complete revolution in view of the type of stock-feeding mechanism employed. Such revolution is possible, of course, only after lock-bolt $b^{12}$ has been withdrawn, but this is accomplished simultaneously with the retraction of the slide by cam-way $b^{16}$ coacting with the roller on bent lever $b^{14}$. Such partial revolution of the spindle-head leaves the chuck-actuating collar $b^7$ of the spindle already referred to in engagement with mechanism P which is thereupon actuated by cam $E^3$ to open the chuck of such spindle. Pending such actuation moreover clutch $D^4$ is thrown out so that rotation of the spindles temporarily ceases. Immediately after the chuck of the particular spindle in question has been opened stock-feeding mechanism H is raised and grips the stock in the same spindle and feeds it forward until it encounters stop $C^2$ advancing in the opposite direction through tool-head C. Mechanism H thereupon releases its grip and is again depressed to its normal position where it is out of the way of the stock as the spindle-head is given another partial turn in the same manner as before. As soon, however, as the feeding of the stock has been completed, and before such revolution of the spindle-head begins, chuck-actuating mechanism P closes the chuck; at the same time the advance of the spindle-head under action of cam-drum $E^2$ takes place, in the course of which advance bolt $b^{12}$ is again permitted to lock the head securely in the slide. Before the forward ends of the spindles are thus brought into operative relation with the tools in tool-head C, rotation of the spindles of course begins, such rotation being effected, as has above been fully set forth, by the action of cam-wheel $E'$ in periodically throwing in clutch $d^4$ on back-shaft D. The tool borne by slide-member $F^2$ of cross-slide F is preferably brought into play after such rotation begins and before the tool in the tool-head that would operate on the same piece of stock comes into engagement therewith; by that time slide-member $F^2$ may be again withdrawn and thus both tools can operate not only on the same piece of stock but on the same portion of such piece of stock, the one completing the operation begun by the other where such operation, as is often the case, is too heavy to be accomplished in a single cut. If desired, the tool on slide-member $F^2$ instead of being thus brought into play before the fixed tool in tool-head C, may be brought afterward as the retraction of the slide begins, just as in the case of the cutting-off tool on the other slide-member $F^3$ whose operation has necessarily to be deferred until this time. Thus one cycle of operation of my lathe is completed, for, as soon as retraction of the slide is again begun, rotation of the spindles ceases, the spindle-head is unlocked, given a partial progressive revolution, or rather two such partial revolutions, so as to bring each spindle into position to be operated upon by a new tool, and then advanced and locked in this new position. Pending such retraction the stock in the spindle that had been operated upon by the last tool in the series, the finished article being thereupon cut off, is fed forward as has been described, to begin anew the round of operations. In this way, as is evident, all the tools are simultaneously employed and a completed article is produced with every reciprocation of the slide.

Both inner shaft $D^2$ of back-shaft D, whereby the spindle-head $B'$ is indexed, and cam-shaft E whereby reciprocation of the slide, in which such spindle-head is mounted, is effected, are rotated, as has been seen, through change speed-gear M. The shifting of clutch $M^5$ of such mechanism is regulated to drive shaft $D^2$ at the relatively high speed at all times that stop $N'$ permits operative connection of such shaft with such driving gear; so too shaft E is driven at the same high speed at all times except during the comparatively brief interval that the stock is being advanced against the tools, the slow speed being employed at this stage for obvious reasons. The periodic rotation of the spindles, on the contrary, is effected through entirely independent gearing and connections and should be at a still higher "cutting" speed.

The general operation of the lathe as above outlined, is modified in but a few particulars when chuck-actuating mechanism R, in conjunction with stock-feeding device T, is substituted for mechanism P and device H. In such case the chuck of the spindle that was in juxtaposition with the last tool of the series is opened as soon as the retraction of the spindle-head slide begins, and at the same time device T holds the stock against longitudinal movement so as to, in effect, feed it forward through such spindle. When it has thus been fed forward a little more than the required amount, a stop of the usual form is advanced through the tool-head to gage such amount exactly and the chuck of the spindle then closed. The slide is now advanced either after or pending the revolution of the spindle-head therein. Such revolution, as has been explained, is through a full quarter-turn instead of through an eighth-turn only, and a saving of time is thus effected by the use of this arrangement instead of the first one.

It is thus seen that I fundamentally alter the arrangement of parts heretofore maintaining in turret-lathe construction. I begin by dispensing entirely with the familiar periodically revoluble and longitudinally reciprocable tool-holding turret; in place thereof I employ a fixed tool-head in which the tools can be rigidly secured and the highest degree of accuracy attained in their adjustment. In conjunction with such fixed tool-head, I employ a relatively movable spindle-head in which are mounted rotary stock-holding means of otherwise familiar type. Such means, instead of consisting of a single spindle, may consist of a plurality of such spindles, preferably as many as there are tools in the fixed tool-head. In this way a plurality of operations that have to be successively performed on any one piece of stock may be simultaneously performed on different pieces of stock. The drive-shaft whereby the spindle-head is indexed and the spindles therein rotated, is disposed entirely to one side of the machine, and the working-space between spindle-head and tool-head thus left entirely clear. Moreover the automatic interruption of the rotation of the spindles rendered possible by the disposition of drive shaft and the clutch $D^4$ connected therewith, prevents the rapid wear of the chuck-actuating collars that has heretofore characterized this class of machine. The new conditions presented by the above radical changes have led to the designing of a cross-slide presenting certain elements of novelty; likewise a novel form of chuck-actuating mechanism, and of stock-feeding device, have had to be devised. Along with the foregoing I would again call attention to the stock-rest, sliding cam, adjustable tool-holder, change-speed mechanism, and other details of my lathe, all of which are intimately associated with the first-named elements both in construction and operation, and all of which present novel features deserving of consideration. The whole forms a machine not only of increased capacity over any heretofore devised, but one of simpler design and capable of more exact adjustment.

Having thus described my invention in detail, that which I particularly point out and distinctly claim, is:

1. In a lathe, the combination of a fixed head; tools mounted therein; a reciprocable slide; a head revolubly mounted in said slide; a plurality of stock-holding spindles rotatably mounted in said revoluble head; means for revolving the latter in said slide; and means for reciprocating said slide.

2. In a lathe, the combination of a fixed head; tools adjustably secured therein; a reciprocable slide; a head revolubly mounted in said slide; a plurality of stock-holding spindles rotatably mounted in said revoluble head, said spindles being angularly equidistantly disposed about the axis of said head; means adapted to reciprocate said slide; and means adapted to intermittently progressively revolve said head through an angular distance equal to that between successive spindles.

3. In a lathe, the combination with a support comprising a housing split in a longitudinal plane; of a turret-head revolubly mounted therein; a plurality of spindles rotatably mounted in said head; pinions fixed upon said spindles so as to rotate therewith; and an annular driving member externally journaled in said support in a continuation of the bore forming the bearing of said turret-head.

4. In a lathe, the combination with a support comprising a housing split in a longitudinal plane and provided with an annular recess; a turret head revolubly mounted in said housing; a plurality of spindles rotatably mounted in said head; pinions fixed upon said spindles so as to rotate therewith; and a combined internal and external gear externally journaled in said housing in a continuation of the bore forming the bearing of said turret-head, said gear engaging said pinions with its inner face and having the toothed portion of its external face disposed in the recess in said housing.

5. In a lathe, the combination with a support; of a turret-head made up of two end plates suitably held together and revolubly mounted in said support; a plurality of spindles rotatably mounted in said head; pinions fixed upon said spindles, so as to rotate therewith, intermediately between the respective ends of said head; and an internal gear having its respective lateral portions externally journaled in said support, said gear being inclosed by said support and engaging said pinions with its inner face.

6. In a lathe, the combination of a reciprocable slide; a turret-head revolubly mounted therein; a plurality of spindles rotatably mounted in said head; pinions fixed upon said spindles, so as to rotate therewith; a combined internal and external gear rotatably mounted in said slide and engaging said pinions with its inner face; a drive-shaft disposed laterally, and parallel with the path of movement, of said slide; and a pinion borne by said shaft and adapted to engage with the outer face of said gear irrespective of the position of said slide.

7. In a lathe, the combination with a fixed head and tools secured therein; of a reciprocable slide; a head revolubly mounted therein; a plurality of stock-holding spindles rotatably mounted in said head; pinions fixed on said spindles so as to rotate therewith; a combined internal and external gear rotatably mounted in said slide and engaging said pinions with its inner face; a drive-shaft disposed laterally of and alined with said fixed head and reciprocatory slide, said shaft bearing a pinion adapted to engage with the outer face of said gear irrespective of the position of said slide; and bearings rigid with said fixed head for supporting the one end of said drive shaft, said reciprocatory slide affording a sliding bearing for the other end thereof.

8. In a lathe, the combination with a fixed head and tools secured therein; of a reciprocatory slide formed laterally with a housing; a head revolubly mounted in said slide; a plurality of stock-holding spindles rotatably mounted in said head; pinions fixed on said spindles so as to rotate therewith; a combined internal and external gear inclosed by and externally journaled in said slide, said gear engaging said pinions with its inner face; a drive-shaft disposed to the rear of and alined with said fixed head and reciprocatory slide, said shaft being provided with an elongated pinion adapted to engage with the outer face of said gear irrespective of the position of said slide; and bearings rigid with said fixed head for supporting one end of said shaft, the lateral housing on said slide affording a sliding bearing for the other end thereof.

9. In a lathe, the combination with a support; of a turret-head revolubly mounted therein and provided with an external gear; a plurality of spindles rotatably mounted in said head; pinions fixed upon said spindles so as to rotate therewith; a combined internal and external gear rotatably mounted in said support and engaging said pinions with its inner face; and two shafts, one within the other, laterally disposed with reference to said head and respectively connected to drive said combined gear and the gear on said head.

10. In a lathe, the combination with a support; of a turret-head made up of two end-pieces suitably held together and revolubly mounted in said support, one of said end pieces being formed with an external gear; a plurality of spindles rotatably mounted in said head; pinions fixed on said spindles, so as to rotate therewith, intermediately between the respective ends of said head; a combined internal and external gear inclosed by and externally journaled in said support, said gear engaging said pinions with its inner face; and driving means for the gear on said head and for said combined gear, respectively.

11. In a lathe, the combination with a support; of a turret-head made up of two end pieces suitably held together and revolubly mounted in said support, one of said end pieces being formed with an external gear; a plurality of spindles rotatably mounted in said head; pinions fixed upon said spindles so as to rotate therewith, intermediately between the respective ends of said head; a combined internal and external gear rotatably mounted within said support and engaging said pinions with its inner face; and two shafts, one within the other, supported laterally of said head and respectively connected to drive said combined gear and the gear on said head.

12. In a lathe, the combination with a support formed laterally with a housing; of a turret-head made up of two end pieces suitably held together and revolubly mounted in said support, one of said pieces being formed with an external gear; a plurality of spindles rotatably mounted in said head; pinions fixed upon said spindles, so as to rotate therewith, intermediately between the respective ends of said head; a combined external and internal gear inclosed by and externally journaled in said support, said gear engaging said pinions with its inner face; and two shafts supported, one within the other, in such lateral housing and bearing pinions respectively engaging said combined gear and the gear on said head.

13. In a lathe, the combination with a reciprocatory slide; of a turret-head revolubly mounted therein and provided with an external gear; a plurality of spindles rotatably mounted in said head; pinions fixed upon said spindles so as to rotate therewith; a combined internal and external gear journaled within said slide and engaging said pinions with its inner face, and two shafts, one within the other, laterally disposed with reference to said head and respectively connected to drive said combined gear and the gear on said head, irrespective of the position of said reciprocatory slide.

14. In a lathe, the combination with a reciprocatory slide formed laterally with a housing; of a turret head revolubly mounted in said support and provided with an external gear; a plurality of spindles rotatably mounted in said head; pinions fixed upon said spindles; so as to rotate therewith a combined internal and external gear journaled within said slide, and engaging said pinions with its inner face; a tubular drive shaft supported in such lateral housing so as to be longitudinally slidable, said shaft being formed with an elongated pinion adapted to engage with the outer face of said combined gear irrespective of the position of said slide; a second shaft within said tubular shaft; and a pinion splined on said second shaft, said pinion being carried in such housing so as to be constantly in engagement with the gear on said head.

15. In a lathe, the combination with a reciprocatory slide; of a turret-head revolubly mounted therein and provided with an external gear; a plurality of stock-holding spindles rotatably mounted in said head; pinions fixed on said spindles; so as to rotate therewith; a combined internal and external gear rotatably mounted in said slide and engaging said pinions in its inner face; a drive shaft parallel with the path of movement of said slide; a pinion housed in said slide and splined upon said shaft such pinion meshing with the gear on said turret head; an elongated pinion rotatably mounted on said shaft and meshing with the outer face of said combined internal and external gear; and means for independently rotating said shaft and such pinion mounted thereon.

16. In a lathe, the combination with a suitable support; of a cross-slide mounted thereon and provided with a rotatable worm-rack; a lever arm pivotally mounted in said support and provided with a toothed segment engaging said worm-rack; and means for oscillating said lever arm.

17. In a lathe, the combinatuon with the lathe-bed; of a tool head; tools secured therein; a member reciprocably mounted on said bed; a turret-head revolubly mounted in said member; a plurality of stock-holding spindles rotatably mounted in said head; a tool-holding cross-slide also mounted in said member; means for periodically reciprocating said cross-slide; and means adapted to progressively revolve said turret-head to bring successive spindles into juxtaposition with said cross-slide.

18. In a lathe, the combination with a lathe-bed; of a tool-head; tools secured therein; a member reciprocably mounted on said head; a turret-head revolubly mounted in said member; a plurality of stock-holding spindles rotatably mounted in said head; a tool-holding cross-slide also mounted in said member; means respectively adapted to progressively revolve said turret-head and to reciprocate said member, whereby each of said stock-holding spindles is brought into operative relation with successive tools in said tool-head; and means adapted to reciprocate said cross-slide irrespective of the position of said member.

19. In a lathe or the like, the combination with the lathe bed; of a tool head; tools dexing said head, respectively; common driving means for said mechanisms, said driving means being directly connected with said spindle-rotating mechanism; change-speed gear connecting said chuck-actuating and head-indexing means with said driving means; and a clutch automatically controlling connection between said driving means means for all aforesaid shafts, said driving means being directly connected with said head-indexing shaft; a clutch controlling such connection, said clutch being operated from said first named shaft and timed to stop rotation of said spindles pending operation of said chuck-actuating means; and change-speed gear connecting said driving means with the two remaining shafts.

27. In a lathe, the combination with a tool-head and tools secured therein; of a slide; a head revolubly mounted in said slide; a spindle rotatably mounted in said head; said spindle being provided with stock-gripping means; means for revolving said head; and means arranged and constructed to operatively engage said stock-gripping means at one point in the revolution of said head irrespective of the position of said slide.

28. In a lathe, the combination with a tool head and tools secured therein; of a reciprocatory slide; a head revolubly mounted in said slide; a spindle rotatably mounted in said head; and means arranged and constructed to operatively engage said chuck-actuating means at one point in the revolution of said head irrespective of the position of said slide.

29. In a lathe, the combination with a tool head and tools secured therein; of a slide; a head revolubly mounted in said slide; a plurality of spindles rotatably mounted in said head, each of said spindles being provided with a chuck and reciprocatory chuck-actuating means; means adapted to reciprocate said slide; means adapted to intermittently, progressively revolve said head; and means adapted to successively engage and reciprocate said chuck-actuating means pending the revolution of said head, operation of said means being had irrespective of the position of said slide.

30. In a lathe, the combination with a tool-head and tools secured therein; of a slide; a head revolubly mounted in said slide; a plurality of spindles rotatably mounted in said head, each of said spindles being provided with a chuck and reciprocatory chuck-actuating means; means adapted to reciprocate said slide; means adapted to intermittently, progressively revolve said head; a member movably mounted on said slide and adapted to engage the chuck-actuating means of successive spindles at the conclusion of each partial revolution of said head; and means adapted to move said member to operate said chuck-actuating means pending such engagement, irrespective of the position of said slide.

31. In a lathe, the combination with a tool-head and tools secured therein; of a slide; a head revolubly mounted in said slide; a plurality of spindles rotatably mounted in said head, said spindles being angularly equidistantly disposed about the axis of said head, and each being provided with a chuck and chuck-actuating means; means adapted to advance and retract said slide; means adapted to progressively revolve said head through an angular distance equal to half that between successive spindles pending the advance and retraction respectively of said slide; a member movably mounted on said slide and adapted to engage the chuck-actuating mechanism of successive spindles at the conclusion of each alternate partial revolution of said head; and means adapted to move said member to operate said chuck-actuating means pending such engagement.

32. In a lathe, the combination with a tool-head and tools secured therein; of a slide; a head revolubly mounted in said slide; a plurality of spindles rotatably mounted in said head, each of said spindles being provided with a chuck and reciprocatory chuck-actuating means; a shaft parallel with said slide; a cam-wheel fixedly mounted on said shaft and adapted to engage and reciprocate said slide; a second cam-wheel secured to said shaft so as to be movable therealong, said second cam-wheel being held by said slide so as to be thus moved in unison therewith; and an arm mounted on said slide and adapted to be actuated by said second cam to engage and reciprocate said actuating means pending the rotation of said head irrespective of the position of said slide.

33. In a lathe, tool-holding means comprising a fixed head; a plurality of tool-receiving pockets therein; and lock-bolts adapted to secure tools in said respective pockets, said bolts being horizontally disposed and all having their heads on the same side of said tool-head.

34. In a lathe, tool-holding means comprising a fixed head; a plurality of alined tool-receiving pockets therein; clamping members for said pockets respectively; said members being disposed transversely of said pockets in substantially horizontal planes; and similarly disposed lock-bolts for drawing up and loosening said members, all of said bolts having their heads on the same side of the tool-head.

35. In a lathe, stock-feeding means comprising a member reciprocable in the direction of movement of the stock, and a device reciprocable in said member transversely of direction of movement, and adapted to grip the stock independently of said member.

36. In a lathe, stock-feeding means comprising a member reciprocable in the direction of movement of the stock; a device reciprocable in said member transversely of such direction of movement, and adapted to grip the stock independently of said member; and means controlling actuation of said gripping device incidentally to its reciprocation in said member.

37. In a lathe, the stock-feeding means comprising a member reciprocable in the direction of movement of the stock; a gripping device reciprocable in said member transversely of such direction of movement; and a spring adapted to actuate said device to grip the stock, said member being constructed to retain said spring inactive in one position, and to permit its action in another position of said device therein.

38. In a lathe, stock-feeding means comprising a member reciprocable in the direction of movement of the stock and provided with a slide-way transversely disposed with reference to such direction; a block mounted in said slide-way; a spring normally maintaining said block in one position; a cam adapted to periodically move it therefrom; a gripping device mounted upon said block; and means borne by said block and coöperative with said device as it is thus moved to control actuation thereof.

39. In a stock-feeding mechanism for a lathe or the like, the combination with a member reciprocable in the direction of movement of the stock; of a second member mounted on said first member and movable transversely of said member's direction of movement; and gripping means mounted on said second member, such means comprising a tongs, a spring normally tending to close the same, and means borne by said block and coöperative with said tongs for controlling the action of said spring.

40. In stock-feeding mechanism for a lathe or the like, the combination with a member reciprocable in the direction of movement of the stock; of a second member mounted on said first member and movable transversely of said member's direction of movement; gripping means mounted on said second member, such means comprising a tongs and a spring normally tending to close the same; studs on said first member adapted in one position of said second member to engage said tongs and hold the same open; and a spring normally maintaining said second member in such position.

41. In a lathe, the combination of a tool-head; tools secured therein; a spindle head revolubly mounted with respect to said tool-head; a plurality of spindles rotatably mounted in said revoluble head; means adapted to progressively revolve said spindle head alternately to operatively and inoperatively position said spindles with respect to said tools; and means adapted to advance the stock in successive spindles when thus inoperatively positioned.

42. In a lathe, the combination of a tool head; tools secured therein; a reciprocable slide; a head revolubly mounted in said slide; a plurality of stock-holding spindles rotatably mounted in said revoluble head, said spindles being angularly equidistantly disposed about the axis of said head; means adapted to retract and advance said slide; means adapted to progressively revolve said head through an angular distance equal to half that between successive spindles, pending the retraction and advance, respectively, of said slide, the spindles in said head being operatively positioned with respect to said tools in the latter of such positions; and means adapted to advance the stock in said spindles when in their retracted position.

43. In a lathe, the combination of a tool-head; tools secured therein; a reciprocable slide; a head revolubly mounted in said slide; a plurality of stock-holding spindles rotatably mounted in said revoluble head, said spindles being angularly equidistantly disposed about the axis of said head; means adapted to retract and advance said slide; means adapted to progressively revolve said head through an angular distance equal to half that between successive spindles, pending the reaction and advance, respectively, of said slide, the spindles in said head being operatively positioned with respect to said tools when said head is thus advanced; and stock feeding means independent of said spindles adapted to engage the stock in successive spindles when said head is retracted and said spindles inoperatively positioned.

44. In a lathe, the combination of a tool-head; tools secured therein, a stop intermediate between two such tools; a slide; a head revolubly mounted in said slide; a plurality of stock-holding spindles rotatably mounted in said revoluble head; means adapted to advance and retract said slide; means adapted to progressively revolve said spindle head alternately to operatively position said spindles with respect to said tools and to similarly position in succession one of the same with respect to said stop; and means adapted to advance the stock in successive spindles when positioned as last stated.

45. In a lathe, the combination of a tool head; tools secured therein: a stop intermediate between two such tools; a slide; a head revolubly mounted in said slide; a plurality of stock-holding spindles rotatably mounted in said revoluble head, said spindles being angularly equidistantly disposed about the axis of said head; means adapted to advance and retract said slide; means adapted to progressively revolve said head through an angular distance equal to half that between successive spindles, pending the advance and retraction, respectively, of said slide, the spindles in said head being operatively positioned with respect to said tools at the end of the first of said movements, and successive spindles being similarly positioned with respect to said stop at the end of the second of said movements; and means adapted to advance the stock in successive spindles when positioned as last stated.

46. In a lathe, the combination with a revoluble head and a plurality of rotary spindles mounted therein; of stock-feeding means comprising a member reciprocable in the direction of movement of the stock in said spindles; and a gripping device mounted in said member so as to have a movement of translation with respect thereto, said device being adapted to grip stock independently of said member.

47. In a lathe, the combination with a revoluble head and a plurality of rotary spindles mounted therein; of stock-feeding means comprising a member reciprocable in the direction of movement of the stock in said spindles; a gripping device reciprocable in said member in a substantially radial direction with respect to the axis of said head; and a spring adapted to actuate said device to grip the stock, the operation of said spring being controlled by the reciproaction of said device in said member.

48. In a lathe, the combination with a revoluble spindle-head and a plurality of rotary spindles mounted therein; of stock-feeding means comprising a member reciprocable in the direction of movement of the stock through said spindles; a gripping device mounted in said member and movable in a substantially radial direction with respect to the axis of said head; means adapted to periodically actuate said gripping device to grip the stock in successive spindles as said spindle-head revolves; and means adapted to simultaneously actuate said reciprocable member.

Signed by me, this 12" day of April 1906

JOHN J. GRANT.

Attested by:
  JNO. F. OBERLIN,
  G. W. SAYWELL.